United States Patent
Hatoh et al.

(10) Patent No.: US 7,029,785 B2
(45) Date of Patent: Apr. 18, 2006

(54) POLYMER ELECTROLYTE FUEL CELLS, METHODS OF MANUFACTURING ELECTRODES THEREFOR, AND APPARATUSES FOR MAKING THE SAME

(75) Inventors: Kazuhito Hatoh, Osaka (JP); Hisaaki Gyoten, Shijonawate (JP); Toshihiro Matsumoto, Ibaraki (JP); Hiroki Kusakabe, Sakai (JP); Yoshiki Nagao, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 176 days.

(21) Appl. No.: 10/328,624

(22) Filed: Dec. 23, 2002

(65) Prior Publication Data

US 2003/0143454 A1 Jul. 31, 2003

Related U.S. Application Data

(63) Continuation of application No. PCT/JP01/05337, filed on Jun. 21, 2001.

(30) Foreign Application Priority Data

| Jun. 22, 2000 | (JP) | ............................. 2000-187260 |
| Aug. 17, 2000 | (JP) | ............................. 2000-247810 |
| Jan. 17, 2001 | (JP) | ............................. 2001-009356 |

(51) Int. Cl.
*H01M 4/94* (2006.01)

(52) U.S. Cl. .......................................... 429/42; 429/44
(58) Field of Classification Search ................. 429/40, 429/41, 42, 43, 46, 44
See application file for complete search history.

(56) References Cited

U.S. PATENT DOCUMENTS

| 4,876,115 | A | * | 10/1989 | Raistrick ..................... 427/115 |
| 5,186,877 | A | * | 2/1993 | Watanabe ................ 429/42 X |
| 5,677,074 | A | * | 10/1997 | Serpico et al. ................ 429/43 |
| 5,766,788 | A | * | 6/1998 | Inoue et al. .................. 429/42 |
| 5,843,519 | A |   | 12/1998 | Tada |
| 6,309,772 | B1 | * | 10/2001 | Zuber et al. .................. 429/33 |
| 6,521,381 | B1 | * | 2/2003 | Vyas et al. ................... 429/232 |
| 6,528,201 | B1 | * | 3/2003 | Hitomi ........................ 429/42 |
| 6,713,020 | B1 | * | 3/2004 | Kato et al. .................... 422/98 |

FOREIGN PATENT DOCUMENTS

| EP | 0 731 520 A1 | 3/1996 |
| EP | 0 948 071 A2 | 3/1999 |

(Continued)

OTHER PUBLICATIONS http://www.etek-inc.com/faq.html.*

(Continued)

*Primary Examiner*—Stephen J. Kalafut
(74) *Attorney, Agent, or Firm*—Akin Gump Strauss Hauer & Feld, LLP

(57) ABSTRACT

Methods are provided for easily obtaining a high performance electrode without using an organic solvent for making an ink of an electrode catalyst or a surfactant for making an ink of a water repellent carbon material. The methods of manufacturing an electrode for a polymer electrolyte fuel cell comprise (a) a step of adhering a polymer electrolyte or a water repellent material to fine electrically conductive particles, and granulating the electrically conductive particles to obtain multinary granules, and (b) a step of depositing the multinary granules in layer form to obtain a catalyst layer or a water repellent layer of an electrode. Apparatus for manufacturing the electrodes, as well as polymer electrolyte fuel cells using the electrodes are also provided.

3 Claims, 6 Drawing Sheets

FOREIGN PATENT DOCUMENTS

| | | |
|---|---|---|
| GB | 2 308 320 A | 6/1997 |
| JP | 46-6672 | 12/1971 |
| JP | 61-149269 A | 7/1986 |
| JP | 63-184262 A | 7/1988 |
| JP | 04-305249 A | 10/1992 |
| JP | 05-036418 A | 2/1993 |
| JP | 07-130375 A | 5/1995 |
| JP | 07-296818 A | 11/1995 |
| JP | 08-088008 A | 4/1996 |
| JP | 09-245801 A | 9/1997 |
| JP | 09-265992 A | 10/1997 |
| JP | 10-203888 A | 8/1998 |
| JP | 10-306238 A | 11/1998 |
| JP | 11-057592 A | 3/1999 |
| JP | 11-265721 A | 9/1999 |

OTHER PUBLICATIONS http://www.monographs.iarc.fr/ htdocs/ monographs/vol65/ carbon.htm.*

* cited by examiner

POLYMER ELECTROLYTE FUEL CELLS, METHODS OF MANUFACTURING ELECTRODES THEREFOR, AND APPARATUSES FOR MAKING THE SAME

CROSS-REFERENCE TO RELATED APPLICATIONS

This application is a continuation of International Application No. PCT/JP01/05337, filed Jun. 21, 2001, the disclosure of which is incorporated herein by reference.

BACKGROUND OF THE INVENTION

This invention relates to a polymer electrolyte fuel cells, particularly to an electrodes therefor and a methods and apparatuses of manufacturing the same, and more specifically to an improvement of a catalyst layer of the electrodes.

In a fuel cell using a polymer electrolyte, a fuel gas containing hydrogen and an oxidant gas containing oxygen, such as air, are electrochemically reacted so as to generate electricity and heat simultaneously. This fuel cell basically comprises a polymer electrolyte membrane for selectively transporting hydrogen ions and a pair of electrodes placed on both surfaces of the electrolyte membrane. The electrode is constituted by a catalyst layer having, as a main ingredient, a carbon powder carrying a platinum group metal catalyst, and by a gas diffusion layer made of, e.g., a carbon paper having been subjected to a water repellency treatment, formed on an outer surface of this catalyst layer and having both gas permeability and electronic conductivity.

In order to prevent supplied gases from leaking to the outside, and to prevent an oxidant gas and a fuel gas from intermingling with each other, a gas sealing material and a gasket are placed at a peripheral portion of the electrode to sandwich the polymer electrolyte membrane. This sealing material and the gasket are preliminarily assembled integrally with the electrode and the polymer electrolyte membrane. This assembly is called an MEA (electrolyte membrane-electrode assembly). Outside the MEA are placed electrically conductive separator plates for mechanically fixing the MEA and for electrically connecting neighboring MEAs in series with each other. At portions of the separator plates, which portions are to contact the MEAs, gas flow channels are formed for supplying reactive gases to surfaces of the electrodes and for carrying away generated gases and excessive gases. The gas flow channels can be provided separately from the separator plates, but it is conventional to provide grooves, as gas flow channels, on the surfaces of the separator plate.

For a catalyst layer in a polymer electrolyte fuel cell, a thin sheet made by forming a mixture of a fine carbon powder, carrying a platinum group metal catalyst, with a polymer electrolyte is generally used. Usually, it is conventional to make this catalyst layer by: mixing a fine carbon powder carrying a catalyst with an alcohol solvent, such as ethanol, having a polymer electrolyte dissolved or dispersed therein; adding to such mixture an organic solvent, such as isopropyl alcohol or butyl alcohol, having a comparatively high boiling point to make an ink; and forming the layer by a screen printing process, a spray coating process, a doctor blade process, a roll coating process, or the like. The concentrations of commercially available polymer electrolyte solutions or dispersions are at most about 10%, which are not high concentrations. Accordingly, in order to mix a comparatively large amount of polymer electrolyte with a fine carbon powder carrying a catalyst, a large amount of polymer solution or dispersion has to be mixed with the fine carbon powder carrying the catalyst. Therefore, in some cases, an ink made by mixing a polymer electrolyte solution or dispersion with a fine carbon powder carrying a catalyst decreases too much in its viscosity to obtain a desired high viscosity ink.

Thus, there is another process, in which a solvent of an ink is evaporated, so as to obtain a high viscosity ink. However, according to such process, it is difficult to make highly reproducible inks, depending on ink lots. Therefore, there is still another method used for preparing an ink which is: to preliminarily evaporate and solidify a polymer electrolyte solution or dispersion; to dissolve or disperse it in an organic solvent, such as isopropyl alcohol or butyl alcohol, having a comparatively high boiling point, thereby to make a solution containing a desired concentration of polymer electrolyte; and to mix therewith a fine carbon powder carrying a catalyst. At any rate, it has been conventional to use, as a solvent for an ink, an alcohol solvent such as propyl alcohol or butyl alcohol, having a comparatively high boiling point in comparison with solvents such as methanol and ethanol having low boiling points, in order to avoid a change of the ink concentration within a short time.

As described above, when an ink to form a catalyst layer is prepared by adding a further solvent to a liquid mixture of a solution or dispersion of a polymer electrolyte with a fine carbon powder carrying a catalyst, the kinds of solvents to be added have much influence on the material properties of the polymer electrolyte to be mixed with the carbon powder, and consequently much influence on cell performance. Generally, a higher performance electrode can be obtained as comparatively thinner layers of polymer electrolyte are more uniformly adhered to surfaces of a fine carbon powder carrying a catalyst. If, with a solution or dispersion of polymer electrolyte, an organic solvent or water or the like having a polarity extremely different from that of the above is mixed, the polymer electrolyte having been dissolved or finely dispersed therein is agglomerated and separated. If an ink made of such solution is used, comparatively big agglomerates of the polymer electrolyte are adhered to the surfaces of the fine carbon powder carrying the catalyst, so that the electrode performance decreases. Thus, it has been a general practice to use, for preparing inks, alcohol solvents having properties comparatively closer to those of the solution or dispersion of the polymer electrolyte, or organic solvents having comparatively strong polarities, such as butyl acetate, particularly alcohol solvents having comparatively high boiling points in view of the slowness in their evaporation. Further, an alcohol solvent having a comparatively high boiling point has generally been used for the above reason also in the case when an ink is made by: preliminarily evaporating and solidifying a solution or dispersion of polymer electrolyte; dissolving or dispersing the same in an organic solvent, such as isopropyl alcohol or butyl alcohol, having a comparatively high boiling point, thereby making a solution or dispersion of polymer electrolyte having a desired solvent and a desired concentration; and mixing therewith a fine carbon powder carrying a catalyst.

Further, in order to uniformly adhere electrolyte layers to surfaces of a fine carbon powder carrying a catalyst, it has been an indispensable step, for the above reason, to mix an organic solvent containing the polymer electrolyte with a fine carbon powder carrying the catalyst.

On the other hand, a gas diffusion layer is usually constructed of a porous carbon layer, such as a carbon non-woven fabric, having been subjected to water repellency treatment, and is provided, in some cases, with a water repellent carbon layer on a surface thereof interfacing with a catalyst layer, for the purpose of keeping the catalyst layer or the polymer electrolyte membrane in a wet condition. The water repellent carbon layer is usually made as follows. First, fine carbon particles and a dispersion of fine fluorocarbon resin particles containing a surfactant are mixed with each other, and are processed, e.g., by drying or filtering, thereby to obtain a mixture of the fine carbon particles with the fine fluorocarbon resin particles. This mixture is converted to an ink by using water or an organic solvent, is coated on one surface of a carbon non-woven fabric as a gas diffusion layer by using a process similar to that for the catalyst layer, and is then fired at a temperature of about 300° C. to 400° C., thereby to burn off the surfactant to obtain a water repellent carbon layer. The thus obtained water repellent carbon layer is arranged to be in contact with the catalyst layer. According to this process, a surfactant is indispensable for making an ink from a water repellent carbon material containing e.g. water repellent fine fluorocarbon resin particles. Further, a firing process is indispensable because the surfactant in the formed structure needs to be removed.

The method of using an organic solvent for making an ink of an electrode catalyst, as above described, has problems, e.g., in its safety against ignition, environmental conservation and high cost of the organic solvents per se. Other problems are that the manufacturing process becomes complicated, the manufacturing time increases, and the cost of manufacturing apparatus increases, because a step of drying the organic solvent and a step of collecting the evaporated organic solvent are needed.

The method of using a surfactant for making an ink from a water repellent carbon material needs a firing step, so that it has the problems of a more complicated manufacturing process, longer manufacturing time and higher cost of manufacturing apparatus. Furthermore, because of the problem that the environment is polluted by the odor of incomplete combustion generated during firing, a disposal step is also needed therefor. This has been a factor which decreases productivity.

In order to put fuel cells to practical use, a further improvement of efficiency is needed. For this purpose, it is important to optimize the structure of the catalyst particles of the catalyst layer and the carbon particles carrying them. A manufacturing method for realizing these structures is also necessary.

BRIEF SUMMARY OF THE INVENTION

In view of the foregoing, it is an object of the present invention to provide optimized electrically conductive particles carrying a catalyst to constitute a catalyst layer of an electrode, and a method of manufacturing the same.

It is another object of the present invention to provide a method by which it is easy to control the thickness and the uniformity of the thickness of the catalyst layer and by which electrodes for high performance polymer electrolyte fuel cells can be stably manufactured, and also to provide an apparatus for manufacturing the electrode.

According to one aspect of the present invention, separate steps are adopted of: (a) preparing granulated electrically conductive particles by adhering a polymer electrolyte or a water repellent material to electrically conductive particles for forming an electrode, particularly a catalyst layer or a water repellent layer containing fine electrically conductive particles as represented by a carbon powder; and (b) forming the catalyst layer or the water repellent layer by depositing the granulated electrically conductive particles on an electrode substrate.

It is preferred that an organic solvent, such as alcohol, be used, if at all, only in step (a) as a medium for a solution or dispersion of polymer electrolyte or for a dispersion of water repellent material, and that neither an organic solvent nor a surfactant be used in step (b).

The granulated electrically conductive particles will be generally referred to herein as "electrically conductive multinary granules." The term "multinary" refers to the fact that these granules are aggregates, agglomerates or other adhered masses of primary particles, which granules also contain one or more other electrode materials, including, but not limited to, a catalyst, a polymer electrolyte, and/or a water repellent material. The primary particles are generally fine electrically conductive particles, such as carbon, which may carry the catalyst. These electrically conductive primary particles are sometimes simply referred to herein as the "electric conductor."

As discussed more fully in the detailed description, the multinary granules are formed by any of a number of granulating processes, which may include repeated grinding and granulating steps until the desired granule or particle size is obtained. The granule or particle sizes referred to herein are average diameters determined by visual inspection of granule or particle layers using a transmission electron microscope (TEM).

According to another aspect of the present invention, a polymer electrolyte fuel cell is provided, comprising a hydrogen ion conductive polymer electrolyte membrane, a pair of electrodes sandwiching the hydrogen ion conductive polymer electrolyte membrane therebetween, an electrically conductive separator plate having a gas flow channel for supplying a fuel gas to one of the electrodes, and an electrically conductive separator plate having a gas flow channel for supplying an oxidant gas to the other of the electrodes, wherein: each of the electrodes comprises a catalyst layer and a gas diffusion layer; and wherein the catalyst layer contains electrically conductive multinary granules having an average granule diameter of about 3 µm to 15 µm, the multinary granules comprising electrically conductive primary particles having an average particle diameter not exceeding about 150 nm, a catalyst and a hydrogen ion conductive polymer electrolyte.

The electrically conductive multinary granules preferably carry a water repellent material.

The cell preferably comprises, between the catalyst layer and the gas diffusion layer, a layer of multinary granules having an average granule diameter of about 3 µm to 15 µm and comprising an electrically conductive primary particles having an average particle diameter not exceeding 150 nm.

The electrically conductive primary particles preferably carry a water repellent material on the surfaces thereof.

According to a further aspect of the present invention, a method of manufacturing an electrode for a polymer electrolyte fuel cell is provided, comprising the steps of: (a) adhering a polymer electrolyte to electrically conductive particles carrying a catalyst, and granulating the electrically conductive particles to obtain multinary granules comprising the electrically conductive particles, the catalyst and the polymer electrolyte; and (b) depositing the multinary granules in layer form to produce a catalyst layer of the electrode.

According to another aspect of the method, the present invention provides another method of manufacturing an electrode for a polymer electrolyte fuel cell, comprising the steps of: (a) adhering a water repellent material to fine electrically conductive particles, and granulating to obtain multinary granules comprising the fine electrically conductive particles and the water repellent material; and (b) depositing the multinary granules in layer form to produce a water repellent layer of an electrode.

An additional aspect of the present invention provides an apparatus of manufacturing an electrode for a polymer electrolyte fuel cell, comprising: a dispersion chamber for storing an electrode catalyst powder therein, the chamber having an opening for placing a polymer electrolyte membrane or a gas diffusion layer; an electric field generator for applying an electric field of a given polarity to the polymer electrolyte membrane or the gas diffusion layer when placed at the opening of the dispersion chamber; and a charge generator provided in the dispersion chamber for charging the electrode catalyst powder with an electric charge of a polarity opposite to the polarity of the electric field applied to the polymer electrolyte membrane or the gas diffusion layer. As used herein, the term "electrode catalyst powder" refers to electrically conductive particles carrying a catalyst for an electrode and which may contain other elements such as water repellent material.

A still further aspect of the present invention provides another method of manufacturing an electrode for a polymer electrolyte fuel cell, the method comprising the steps of: applying an electric field of a given polarity to a polymer electrolyte membrane or a gas diffusion layer placed at an opening of a dispersion chamber; charging an electrode catalyst powder stored in the dispersion chamber with a polarity opposite to the polarity of the polymer electrolyte membrane or the gas diffusion layer; applying a layer of the charged electrode catalyst powder to a given position of the polymer electrolyte membrane or the gas diffusion layer; and heat-fusing the layer of the electrode catalyst powder applied to the polymer electrolyte membrane or the gas diffusion layer.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
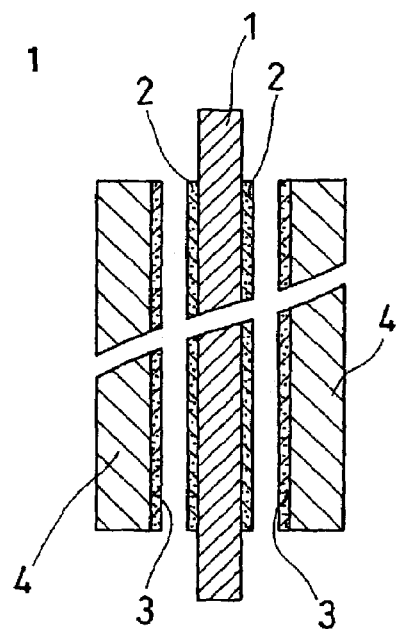
FIG. 1 is a vertical cross-sectional view of an MEA, at a midway point in assembling thereof, according to an example of the present invention.

A method of manufacturing an electrode for a polymer electrolyte fuel cell according to a first embodiment of the present invention comprises, as described above, (a) a step of adhering a polymer electrolyte to fine electrically conductive particles having a primary particle size not exceeding about 150 nm, preferably fine electrically conductive particles of about 10 nm to 150 nm, thereby to obtain multinary granules having been granulated to have a particle size of about 3 µm to 15 µm. The following alternative processes (1) to (3) are preferably used for this step (a):

(1) A process including a step of adhering the electrolyte to the fine electrically conductive particles by spraying a solution or dispersion of the hydrogen ion conductive polymer electrolyte into a dry atmosphere where the fine electrically conductive particles carrying a catalyst flow;

(2) A process including a step of adhering the electrolyte to the fine electrically conductive particles by spraying, into a dry atmosphere, a liquid mixture of a solution or dispersion of the hydrogen ion conductive polymer electrolyte with the fine electrically conductive particles carrying a catalyst; or (3) A process including a step of adhering the polymer electrolyte to the fine electrically conductive particles by mixing, based on a mechanofusion process, the fine electrically conductive particles carrying a catalyst with a powder of the hydrogen ion conductive polymer electrolyte. A mechanofusion process, as used herein, may include subjecting two or more kinds of powders to intense shearing and compression forces, which generate sufficient heat energy to fuse the particles of one powder onto the surfaces of particles of another powder.

According to above process (1), a water repellent material together with the electrolyte can be adhered to the fine electrically conductive particles by spraying a dispersion of the water repellent material together with the solution or dispersion of the hydrogen ion conductive polymer electrolyte.

Further, according to the above process (3), a water repellent material together with the electrolyte can be adhered to the fine electrically conductive particles by using a powder of the water repellent material together with the hydrogen ion conductive polymer electrolyte.

The above step (a) is preferred to further include a step of grinding the multinary granules to a size of about 3 µm to 15 µm.

The above step (a) is preferred to include: adhering the polymer electrolyte to the fine electrically conductive particles by the process of the above (1) or (2); and repeatedly grinding and granulating the electrically conductive multinary granules having the polymer electrolyte adhered thereto, so as to obtain the particle size of about 3 µm to 15 µm.

The above processes (1) and (3) can be applied to the process of adhering a water repellent material to the fine electrically conductive particles by using the water repellent material in place of the polymer electrolyte.

According to this embodiment of the present invention, the method further comprises a step (b), subsequent to the above step (a), of forming a catalyst layer or a repellent layer by depositing the multinary granules in layer form. The following alternative processes are preferably used for this step (b):

(i) A process including a step of electrostatically depositing the multinary granules on a position to form the catalyst layer or the water repellent layer; or (ii) A process including a step of preparing an ink by adding an organic solvent or water to the multinary granules, and a step of forming a catalyst layer or a water repellent layer by depositing and drying the ink on a position to form the catalyst layer or the water repellent layer.

It is preferred that a further step be included, subsequent to the above step (b), wherein the catalyst layer or the water repellent layer is subjected to pressing or compressing, while being heated.

One method of the present invention uses process (1), as above described, as one of the processes to adhere the hydrogen ion conductive polymer electrolyte to the fine electrically conductive particles carrying a catalyst for electrode reaction. According to this process, drops of sprayed solution or a dispersion of the polymer electrolyte are adhered to the surfaces of the fine electrically conductive particles carrying the catalyst, and are dried. By this process, the polymer electrolyte is adhered substantially uniformly on the surfaces of the fine electrically conductive particles carrying the catalyst. According to this process, a dry state polymer electrolyte may in some cases be adhered to the surfaces of the electrically conductive particles, so that means for grinding, while stirring, the electrically conductive particles is preferred to be added, as will be described later in the Examples.

In process (2) a liquid mixture is prepared by mixing the fine electrically conductive particles carrying the catalyst with the solution or dispersion of the hydrogen ion conductive polymer electrolyte. In this liquid mixture, the polymer electrolyte is uniformly adsorbed to the surfaces of the fine electrically conductive particles carrying the catalyst. When this liquid mixture is sprayed, it is sprayed as micro drops, while the condition of the polymer electrolyte being uniformly adhered to the surfaces of the fine electrically conductive particles is maintained. By drying the same, the solvent therein is evaporated off, so that the polymer electrolyte becomes uniformly adhered to the surfaces of the electrically conductive particles carrying the catalyst.

According to the above described process (3), the powder of the hydrogen ion conductive polymer electrolyte is comparatively softer than the electrically conductive particles carrying the catalyst, and is thus subjected to shearing during the mixing based on a mechanofusion process, and can consequently be adhered, as a uniformly thin layer, to the surfaces of the electrically conductive particles carrying the catalyst. Further, in this case, the smaller the particle size of the polymer electrolyte powder to be initially charged, the more effectively it can be adhered, as a uniformly thin layer, to the surfaces of the electrically conductive particles carrying the catalyst.

An electric conductor carrying a catalyst and having a polymer electrolyte and a water repellent material uniformly fixed on the surfaces thereof can provide, as a material to constitute a catalyst layer having a water repellency effect, an electrode having superior characteristics, particularly for operation under a condition of low humidification.

Even if the polymer electrolyte or the water repellent material is adhered to the surfaces of secondary particles of agglomerated electrically conductive primary particles carrying or not carrying a catalyst, the secondary particles can be ground back to primary particles by a grinding step. Further, the polymer electrolyte and the water repellent material can be adhered to the surfaces thereof, by further adding a grinding step subsequent to the above described process (1) or (3). In this manner, the polymer electrolyte and the water repellent material can be more uniformly adhered to the electric conductor.

Since the electrically conductive particles carrying the catalyst have a high catalytic performance, a danger of ignition is entailed in the case where the solution or dispersion of polymer electrolyte or the dispersion of water repellent material uses an organic solvent. Thus, such a danger can be avoided by carrying out the above step in an inert gas atmosphere.

It is more preferable to include a step of granulating the electrically conductive particles carrying or not carrying a catalyst, and to combine it with the grinding step, thereby repeating the grinding and the granulation, and thus repeating the state of secondary particles and the state of the electrically conductive primary particles carrying or not carrying the catalyst, whereby the polymer electrolyte and/ or the water repellent material can be more uniformly adhered thereto. Further, the granulation produces an effect also when the catalyst layer or the water repellent layer is formed, at a post-process, to an electrode shape. That is, when a catalyst layer or a water repellent layer is formed by electrostatic coating, basically only one layer or two layers or so of an electric conductor carrying or not carrying a catalyst are deposited on a coating substrate, irrespective of whether they are primary particles or secondary particles. Therefore, the amount of such deposition can be increased by preliminary granulation. Further, by controlling the particle size of the granulated particles, the amount of deposition (which corresponds to an amount of carried catalyst per unit area in the case of the electric conductor carrying the catalyst) can be controlled.

According to another embodiment of the invention, a catalyst layer or a water repellent layer can be formed by preparing an ink of electrically conductive particles carrying or not carrying a catalyst according to the present invention with water or an organic solvent being used as a medium, and by forming and drying this ink to an electrode shape, using a conventional process of, e.g., screen printing, doctor blading or roll coating. Since, here, dry particles of an electric conductor having preliminarily carried an electrolyte or a water repellent material can be obtained, an optional ink viscosity can be obtained by adding thereto an optional amount of the medium. Further, by selecting only water as the medium to be used for preparing the ink, a coating step without using an organic solvent can be realized.

Moreover, even a drying step can be omitted, when electrically conductive particles carrying a catalyst are deposited, by electrostatic coating, on the surfaces of a polymer electrolyte membrane, and is formed to an electrode shape, because thereby the coating step can be made solvent-free.

A gas diffusion layer can be made on the basis of a solvent-free coating step by including a step of depositing, using electrostatic coating, electrically conductive particles not carrying a catalyst on a catalyst layer formed on the surface of a polymer electrolyte membrane or on a gas diffusion layer of an electrode. Further, it becomes possible thereby not only to omit a drying step, but also to omit a firing step, which was conventionally needed for burning off a surfactant.

Further, the catalyst layer or the gas diffusion layer can be fixed and made stable by the step of having a weight put thereon (pressing or compressing step), while being heated, after it is formed to an electrode shape.

As described above, according to one aspect the present invention, the step of preparing granulated electrically conductive particles (multinary granules) by adhering a polymer electrolyte or a water repellent material to fine electrically conductive particles for forming a catalyst layer or a water repellent layer containing the electrically conductive granules is separated from the step of forming the catalyst layer or the water repellent layer by depositing the electrically conductive granules. This makes it possible to use an organic solvent at only the former step, which can be implemented by a comparatively small size facility. Thus, the electrode manufacturing step, which needs a large size facility, can be a completely organic solvent-free or dry process, and does not have a danger due to organic solvents. Further, it is possible to substantially shorten the manufacturing time and simplify the facility, e.g., because a drying step, e.g. for drying an organic solvent in a formed electrode, becomes unnecessary, and because, from the viewpoint of maintaining and storing materials at a manufacturing site as well, the materials can be easily and stably stored for a long time. Furthermore, since the use of a surfactant is made unnecessary, a firing step for removing the surfactant becomes unnecessary.

Still further, without introducing a pore forming material, an optimum electrode structure can be obtained as an electrode, having a suitable pore distribution, for a polymer electrolyte fuel cell. By electrostatically coating electrically conductive particles carrying a catalyst onto an electrolyte membrane so as to form a catalyst layer, the electrically conductive particles carrying the catalyst are microscopically embedded in the membrane, thereby improving the cell performance. Thus, the formation of an electrode onto a polymer electrolyte membrane, which has been difficult conventionally, can be very easily carried out. According to this embodiment of the present invention, it is easy to mix a water repellent material in a catalyst layer or to structure a water repellent layer, so that high performance cell characteristics can be obtained, even with a low humidified fuel and oxidant to be supplied to the electrode. Further, a higher performance assembly of a polymer electrolyte membrane and an electrode can be obtained by thermally bonding the catalyst layer and the polymer electrolyte membrane.

In the following, an apparatus and a method for electrostatically coating with the above described electrode catalyst powder will be described.

An apparatus for manufacturing an electrode for a fuel cell according to one embodiment of the present invention comprises: a dispersion chamber storing an electrode catalyst powder and having an opening for placing a polymer electrolyte membrane or a gas diffusion layer; an electric field generator for applying an electric field, having a given polarity, to the polymer electrolyte membrane or the gas diffusion layer placed at the opening of the dispersion chamber; and a charge generator provided in the dispersion chamber for charging the electrode catalyst powder to an electric charge of a polarity opposite to that of the electric field applied to the polymer electrolyte membrane or the gas diffusion layer.

This apparatus has the advantages that it: does not need to use a solvent or a surfactant, which is considered to adversely affect cell performance; has a high level of safety; can apply the electrode catalyst powder uniformly to the polymer electrolyte membrane or the gas diffusion layer; and can provide a fuel cell having a high performance.

This apparatus for manufacturing an electrode for a fuel cell preferably comprises a stirrer provided in the dispersion chamber for stirring the electrode catalyst powder to generate self-friction electrification thereof to have an electric charge of a polarity opposite to that of the electric field of the polymer electrolyte membrane or the gas diffusion layer.

According to this structure, fine particles of the electrode catalyst powder are microscopically embedded in the polymer electrolyte membrane by electrodepositing the electrode catalyst powder with an electrostatic force, whereby the cell performance is further improved.

A method of manufacturing an electrode for a fuel cell according to another aspect of the present invention comprises the steps of: applying an electric field of a given polarity to a polymer electrolyte membrane or a gas diffusion layer placed at an opening of a dispersion chamber; charging an electrode catalyst powder stored in the dispersion chamber to an electric charge of a polarity opposite to that of the electric field of the polymer electrolyte membrane; applying the charged electrode catalyst powder to a given position of the polymer electrolyte membrane or the gas diffusion layer placed at the opening; and heat-fusing the layer of the applied electrode catalyst powder.

Since this electrode manufacturing method is of a completely dry process, it has no danger caused by a hazardous material, and can stably store materials, such as the electrode catalyst powder, so that it is economically superior as well.

Since the electrode manufacturing method on the basis of electrostatic coating according to this aspect of the present invention is a completely dry process, materials can be easily stored and stably supplied for a long time from the viewpoint of quality maintenance and storing of the materials at a manufacturing site, so that facilities for the manufacturing process can be substantially simplified. According to the manufacturing method of this aspect of the present invention, the formation of a catalyst layer on a polymer electrolyte membrane, which conventionally was difficult, can be very easily carried out.

The electrostatic coating process according to the manufacturing method of this aspect of the present invention is very much superior as a method of manufacturing an electrode for a fuel cell, because better gas diffusion in the electrode can be obtained as compared to the conventional spray printing process. Further, the electrode and the polymer electrolyte membrane can be thermally bonded, so that a higher performance assembly of polymer electrolyte membrane and catalyst layer can be obtained.

Hereinafter, specific, non-limiting examples of the present invention will be described in detail with reference to the drawings.

Example 1

First of all, a method of making an electrode having a catalyst layer will be described.

Figure 2:
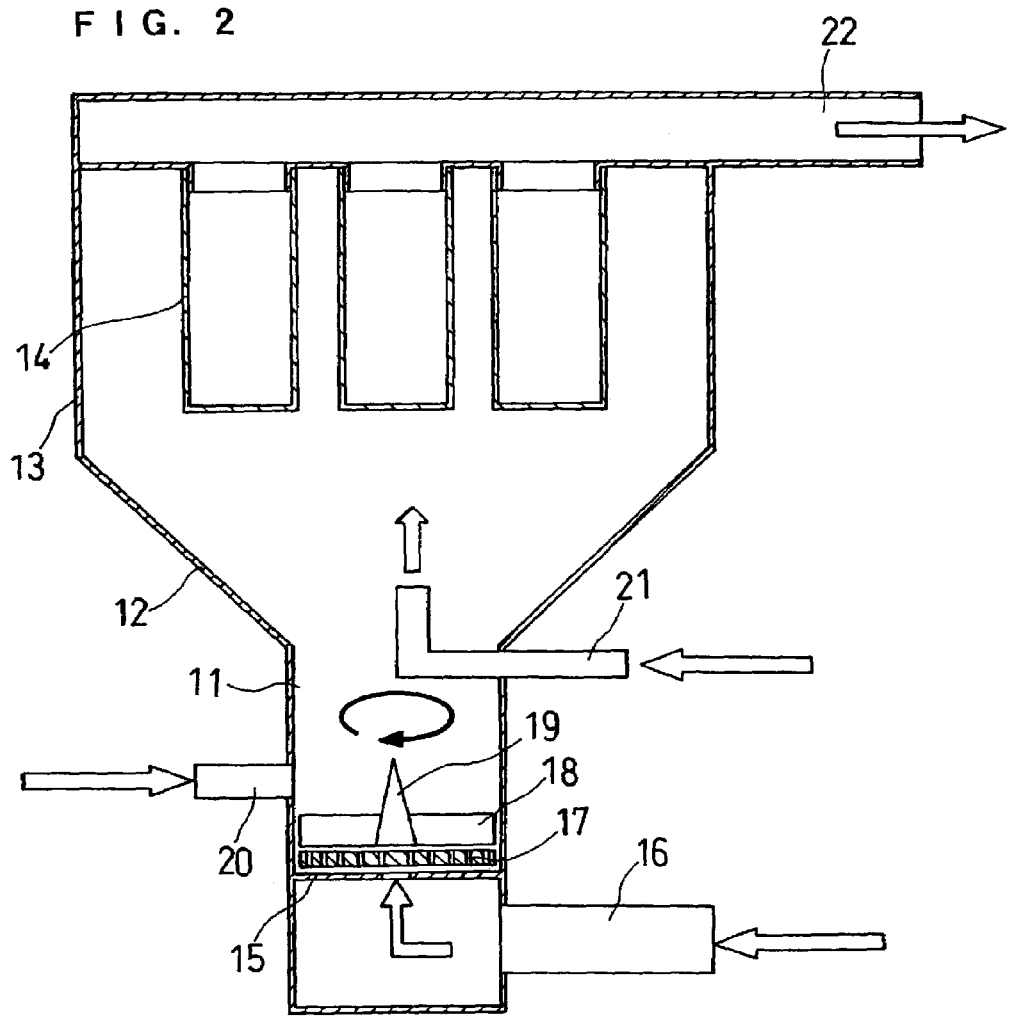
FIG. 2 is a schematic vertical cross-sectional view of an apparatus of preparing an electrode material powder used in an example of the present invention.

A carbon powder (product of Akzo Chemie Company: Ketjen Black EC) having an average primary particle size of 30 nm was allowed to carry platinum particles having an average particle size of about 30 Å in a weight ratio of 50:50. This was referred to as an electric conductor carrying a catalyst for cathode side. Further, the same carbon powder was allowed to carry platinum particles and ruthenium particles having an average particle size of about 30 Å in a weight ratio of 50:25:25. This was referred to as an electric conductor carrying a catalyst for anode side. An ethanol containing 9 wt % of a hydrogen ion conductive polymer electrolyte (product of Asahi Glass Co., Ltd.: Flemion) was used as a solution or dispersion of hydrogen ion conductive polymer electrolyte. From these materials, a material for a catalyst layer of an electrode was made, using an apparatus as shown in FIG. 2.

In the following, an apparatus of FIG. 2 will be described. At an upper portion of a lower cylindrical container 11, a conical member 12 having a taper of upwardly increasing diameter and an upper cylindrical container 13 are connected to constitute an outer container. At a lower portion of the container 11 is provided a heater-equipped nitrogen gas inlet 16, through which a nitrogen gas controlled to have a constant temperature is introduced for causing the inside of the container to have a nitrogen gas atmosphere, and for drying the inside of the system. In the lower container 11 are provided a partition plate 15 having a slit at a central portion thereof, a rotating granulation plate 17 and a stirring blade 18. A nitrogen gas introduced into the lower container 11 is blown up therein via the slit of the partition plate 15 and through ventilation slits being provided at granulation plate 17 and being of such openings that the flow rate therethrough increases from the inside toward the outer circumference thereof. By a flowing wind generated by this nitrogen gas, an electric conductor, carrying a catalyst and introduced into the lower cylindrical container 11, flows. At an upper part of the lower container 11, a high-pressure spray 21 for spraying a solution or dispersion of a polymer electrolyte is provided. The solution or dispersion of polymer electrolyte, while flowing by the nitrogen gas flow, is adhered to the similarly flowing electric conductor, and is dried by the nitrogen gas flow. Thus, the electric conductor with the polymer electrolyte adhered thereto precipitates onto the granulation plate 17, and is granulated to have a particle size corresponding to a gap between the granulation plate 17 and the stirring blade 18. The stirring blade achieves a function to stir and flow, and also a function to grind, the electric conductor carrying the catalyst and the electric conductor with the adhered polymer electrolyte.

At the lower cylindrical container 11 is provided a compressed gas jet nozzle 20, from which a high-pressure nitrogen gas is intermittently jetted in toward a conical collision target 19 placed at a central portion of the stirring blade 18. By this high-pressure jet, the electric conductor at a flowing condition is ground to primary particles. The nitrogen gas introduced into the inside of the system is exhausted to the outside of the system through an outlet 22, with the electric conductor being removed by a bag filter 14. The nitrogen gas exhausted to the outside of the system is cooled by a heat exchanger separately provided outside, with vaporized ethanol being collected, and is again introduced through the nitrogen gas inlet 16, whereby the nitrogen gas is recycled.

The conditions under which the apparatus of FIG. 2 was operated as above are as follows.

Amount of electric conductor carrying catalyst for electrode reaction: 150 g
Solution or dispersion of hydrogen ion conductive polymer electrolyte: 1,050 g
Spray velocity of solution or dispersion of polymer electrolyte by high-pressure spray 21: 10.9 g/min
Nozzle temperature of high-pressure spray 21: 50° C.
Nitrogen gas entrance temperature: 55° C.
Nitrogen gas flow rate: 0.2 m$^3$/min
Rotational speed of stirring blade 18: 350 rpm
On/off interval of pulse-jet jetted from nozzle 20: 0.3 time/4 seconds The electric conductor carrying the catalyst thus obtained had, at the state of primary particles thereof, a hydrogen ion conductive polymer electrolyte uniformly adhered to the surfaces thereof, and was of multinary granules having been granulated to have an average particle size of 10 μm. The thus made electrically conductive particles were mixed with distilled water to make a paste ink for catalyst layer. Next, the paste for catalyst layer was coated, by screen printing process, on each of the front and rear surfaces of a proton conductive polymer electrolyte membrane (product of DuPont Company: Nafion 112) having an outer dimension of 20 cm×32 cm, thereby to form a catalyst layer. By passing the same through a hot roller of 150° C. thereafter, each catalyst layer was fixed to the polymer electrolyte membrane. The catalyst layer thus formed on the surface of the electrolyte membrane had an average thickness of 10 μm, and contained a catalyst metal in an amount of 0.2 mg/cm$^2$.

Meanwhile, carbon non-woven fabrics (product of Toray Industries, Inc.: TGP-H-120), for gas diffusion layers, each having an outer dimension of 16 cm×20 cm and a thickness of 360 μm were immersed in an aqueous dispersion of a fluorocarbon resin powder, were dried, and were then heated at 400° C. for 30 minutes, thereby to have water repellency. On one surface of each this carbon non-woven fabric, a paste ink, made by mixing an electrically conductive carbon powder with water having a water repellent material of a fine polytetrafluoroethylene (PTFE) powder dispersed therein, was coated by screen printing process and dried, thereby to form a water repellent layer having a thickness of about 50 μm. A part of this water repellent layer was embedded in the carbon non-woven fabric.

Next, as shown in FIG. 1, a proton conductive polymer electrolyte membrane 1 having a catalyst layer 2 formed on each of the front and rear surfaces thereof was bonded, by a hot press, with a pair of gas diffusion layers 4 each having a water repellent layer 3 formed thereon in such a manner as for the water repellent layer 3 to get in contact with the catalyst layer 2, thereby to obtain an electrolyte membrane-electrode assembly (MEA). A thin film made of perfluorocarbon sulfonic acid to have a thickness of 50 μm was used for the hydrogen ion conductive polymer electrolyte membrane 1. A gasket plate made of rubber was joined to each peripheral portion of the hydrogen ion conductive polymer electrolyte membrane of the thus made MEA, and manifold holes for communicating cooling water, a fuel gas and an oxidant gas were made therein.

Subsequently, two kinds of separator plates were prepared, each being made of a resin-impregnated graphite plate, having an outer dimension of 20 cm×32 cm and a thickness of 1.3 mm, and having provided thereon a gas flow channel or a cooling water flow channel of a 0.5 mm depth. For every two unit cells each being structured by sandwiching the above described MEA between two separator plates each having a gas flow channel, a separator plate having a cooling water flow channel was inserted to obtain a stack of 100 cells, thereby to assemble a cell stack. On each of the two ends of the cell stack, a current collecting plate made of stainless steel, an insulating plate made of an electrically insulating material and an end plate were put. The two end plates were fixed by being tightened, using tightening rods. The tightening pressure was chosen to be 1.5 MPa/m$^2$ per unit area.

The thus made polymer electrolyte fuel cell according to the present Example was supplied, at 80° C., at one electrode side thereof with a hydrogen gas humidified and heated to have a dew point of 75° C., and at the other electrode side thereof with an air humidified and heated to have a dew point of 60° C. As a result, it showed an open circuit cell voltage of 98 V in the case of no load, outputting no current to outside. This cell was subjected to a continuous powder generation test under the conditions of fuel utilization rate of 85%, oxygen utilization rate of 60% and a current density of 0.7 A/cm$^2$, and was measured with respect to the variation, with time, of the output characteristics thereof. Consequently, it was confirmed that the cell according to the present Example maintained the cell output of about 14.6 kW (65 V-224 A) for 8,000 hours or more.

Example 2

In this Example, by varying the particle sizes of primary particles of carbons each carrying a catalyst and the particle size of those after granulation, correlations thereof with the characteristics of fuel cells were evaluated. Table 1 shows the kinds of carbons, average primary particle sizes, average particles sizes after granulation, and characteristics of fuel cells. The conditions for making fuel cells here were made the same as in Example 1, except for the modes of carbons as shown in Table 1. the same method, as in Example 1, of evaluating fuel cells were employed.

Referring to Table 1, the product name ASTM Code N990 designates a product number of a particle furnace black defined in ASTM, while MFC-2 is a product number of a carbon black produced by Mitsubishi Chemical Corporation. Further, the columns of output voltages, after 200 hours and after 2,000 hours show the output voltages of the fuel cells when 200 hours and 2,000 hours of operation time passed, respectively, after the continuous operation of the fuel cells under the same conditions as in Example 1 started.

TABLE 1

| Product name | Primary particle size (nm) | Multinary granule size (μm) | Output voltage (V) after 200 hours | Output voltage (V) after 2000 hours |
|---|---|---|---|---|
| Ketjen Black EC | 30 | 1 | 75 | 40 |
| | | 3 | 73 | 65 |
| | | 5 | 72 | 68 |
| | | 10 | 70 | 67 |
| | | 15 | 65 | 63 |
| | | 20 | 40 | 35 |
| | | 30 | 30 | 25 |
| ASTM Code N990 | 300 | 5 | 30 | 28 |
| | | 20 | 20 | 17 |
| | | 25 | 10 | 8 |
| ASTM Code N880 | 150 | 1 | 65 | 40 |
| | | 3 | 65 | 60 |
| | | 5 | 64 | 62 |
| | | 10 | 62 | 60 |
| | | 15 | 60 | 57 |
| | | 20 | 30 | 25 |
| | | 30 | 20 | 18 |
| MFC-2 | 15 | 1 | 80 | 50 |
| | | 3 | 78 | 68 |
| | | 5 | 77 | 68 |
| | | 10 | 75 | 68 |
| | | 15 | 72 | 65 |
| | | 20 | 50 | 45 |
| | | 30 | 40 | 35 |

It can be recognized from the results of evaluation in Table 1 that with respect to the characteristics of the fuel cells using the carbon of ASTM Code N990 having a primary particle size of 300 nm, the output voltages thereof are low both at 200 hours and 2,000 hours after the start of the operation. The smaller the multinary granule size becomes, with the primary particle size not exceeding 150 nm, the better the characteristics of the fuel cells, at 200 hours after the start of the operation, become. However, in the case of primary particle size smaller than 5 nm, the characteristics, at 2,000 hours after the start of the operation, get worse contrarily. This is presumably because flow paths in the catalyst layer, for hydrogen ions and water to flow through, are occluded during the long operation of the fuel cells, when the carbon particles carrying the catalyst are too fine.

Example 3

The present Example shows an example in which, by using an apparatus as shown in FIG. 2, a hydrogen ion conductive polymer electrolyte and a water repellent material were joined to electrically conductive particles carrying a catalyst.

Two sets of heater-equipped high-pressure sprays 21 as shown by the one in FIG. 2 are provided and arranged to be able to respectively spray, into the container, a solution or dispersion of hydrogen ion conductive polymer electrolyte and a dispersion containing a water repellent material that are kept at constant temperatures. For the dispersion containing the water repellent material, an aqueous dispersion containing 10 wt % of fine polytetrafluoroethylene particles was used.

The conditions under which the apparatus of FIG. 2 was operated are as follows.
 Amount of electric conductor carrying catalyst for electrode reaction: 150 g
 Amount of solution or dispersion of hydrogen ion conductive polymer electrolyte: 1,200 g
 Amount of dispersion of water repellent material: 500 g
 Spray velocity of solution or dispersion of polymer electrolyte by high-pressure spray: 10 g/min
 Nozzle temperature of this high-pressure spray: 50° C.
 Spray velocity of dispersion of water repellent material by high-pressure spray: 5 g/min
 Nozzle temperature of this high-pressure spray: 80° C.
 Nitrogen gas entrance temperature: 60° C.
 Nitrogen gas flow rate: 0.25 m$^3$/min
 Rotational speed of stirring blade 18: 350 rpm
 On/off interval of pulse-jet jetted from nozzle 20: 0.3 time/4 seconds The electrically conductive particles carrying the catalyst thus obtained had, at the state of primary particles thereof, a hydrogen ion conductive polymer electrolyte and a water repellent material uniformly arranged on the surfaces thereof, and were multinary granules having been granulated to have an average particle size of 10 μm.

Next, the electrically conductive particles carrying the catalyst were deposited by an electrostatic coating process on both the front and the rear surface of a hydrogen ion conductive polymer membrane having an outer dimension of 20 cm×32 cm, thereby to form a cathode catalyst layer and an anode catalyst layer. For the electrostatic coating, a voltage of 3 kV was applied between the polymer electrolyte membrane side and the stock side of the electrically conductive particles carrying the catalyst. The amount of catalyst metal contained in the catalyst layer was chosen to be 0.2 mg/cm$^2$, and the average thickness of the catalyst layer to be 10 μm. According to the coating process by electrostatic coating, basically 1 or 2 particle layers of electrically conductive particles can be deposited on the surface of a polymer electrolyte membrane. Therefore, in the case of depositing fine electrically conductive particles, the particle size of the deposited particles gets substantially equivalent to the coating thickness of the deposition layer. According to studies here, the thickness of the catalyst layer to be able to realize a highest performance is 3 to 15 μm, and thus the electrically conductive particles to be deposited by electrostatic coating are preferred to be preliminarily granulated to be 3 to 15 μm.

Subsequently, a pair of gas diffusion layers each with a water repellent layer formed thereon were bonded, as in Example 1, by a hot press to above described hydrogen ion conductive polymer electrolyte membrane with the catalyst layers formed thereon, thereby to obtain an MEA. By using this MEA, a cell stack similar to that in Example 1 was assembled, and was operated under conditions similar to those therein.

As a result, an open circuit cell voltage of 99 V was obtained in the case of no load, outputting no current to outside. When this cell was subjected to a continuous powder generation test under a current density of 0.7 A/cm$^2$, it was confirmed that it maintained the cell output of about 14.8 kW (66 V-224 A) for 8,000 hours or more.

Example 4

First of all, a method of making an electrode having a catalyst layer will be described.

Figure 3:
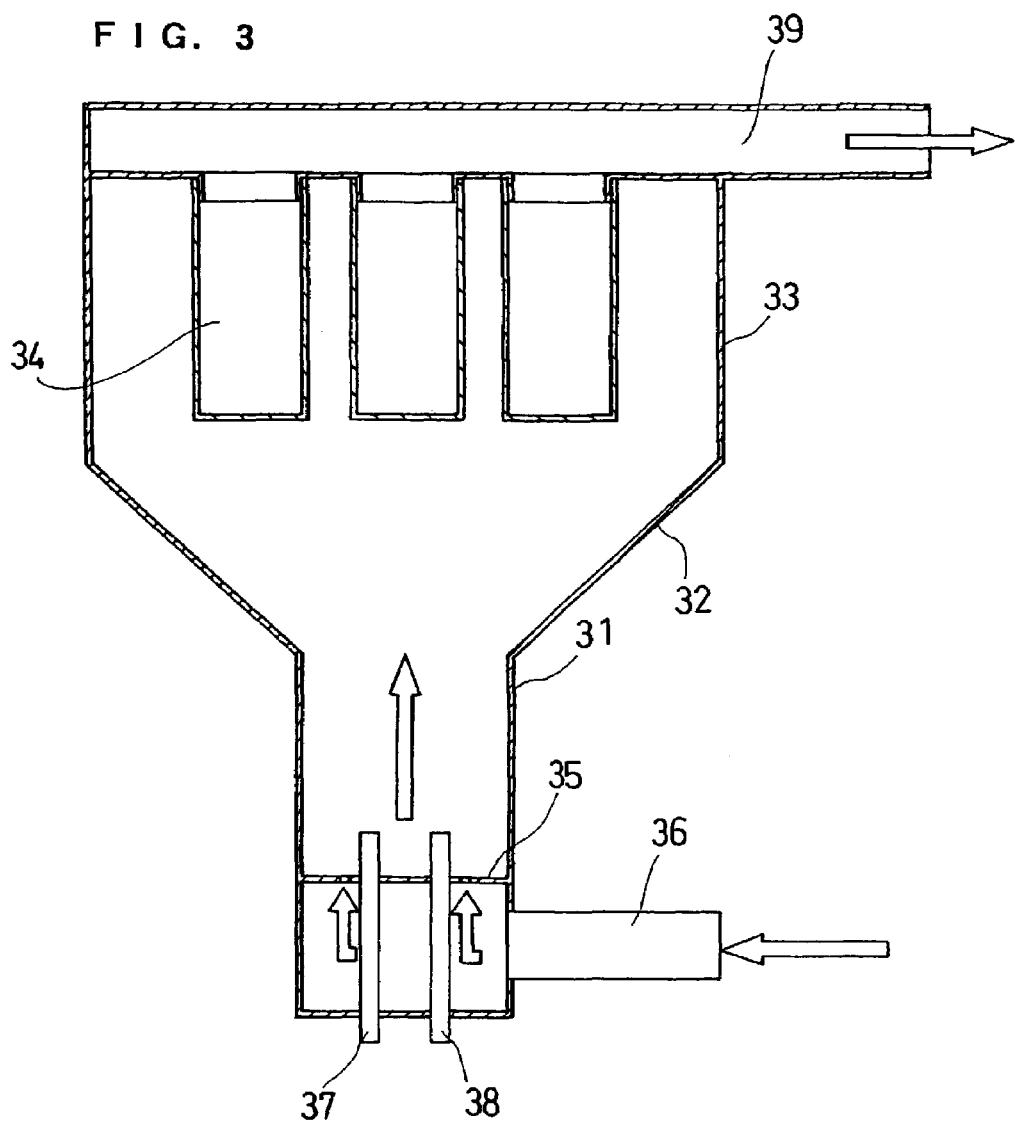
FIG. 3 is a schematic vertical cross-sectional view of an apparatus of preparing an electrode material powder used in another example of the present invention.

A carbon powder the same as that in Example was allowed to carry platinum particles having an average particle size of about 25 Å in a weight ratio of 2:1. This was referred to as an electric conductor carrying a catalyst for electrode reaction, and a material for a catalyst layer of an electrode was made therefrom, using an apparatus as shown in FIG. 3.

In the following, an apparatus of FIG. 3 will be described.

At an upper portion of a lower cylindrical container 31, a conical member 32 having a taper of upwardly increasing diameter and an upper cylindrical container 33 are connected to constitute an outer container. At a lower portion of the lower container 31 is provided a heater-equipped nitrogen gas inlet 36, through which a nitrogen gas controlled to have a constant temperature is introduced for causing the inside of the container to be a nitrogen gas atmosphere, and for drying the inside of the system. A nitrogen gas introduced into the lower container 31 is blown up into the inside of the container through a partition plate 35 having slits.

At the lower container 31, heater-equipped high-pressure sprays 37 and 38 are provided. From one of the sprays, a mixture, kept at a constant temperature, of an electric conductor carrying a catalyst with a solution or dispersion of a polymer electrolyte is sprayed. From the other spray, a mixture of an electric conductor not carrying a catalyst with a dispersion containing a water repellent material is sprayed. Ordinarily, only one or the other of the sprays is operated. Since the spray mist of the liquid mixtures sprayed from these sprays is of extremely fine liquid drops, it gets solidified during its ascending process in the nitrogen gas flow zone, and flows as fine particles. For the solution or dispersion of the hydrogen ion conductive polymer electrolyte, ethanol containing 9 wt % of polymer electrolyte was used. For the dispersion containing the water repellent material, an aqueous dispersion having 10 wt % of fine PTFE particles dispersed therein was used. The nitrogen gas introduced into the inside of the system is exhausted to the outside of the system through an outlet 39, with the electric conductor being removed by a bag filter 34. The bag filter 34 was supplied with vibrations intermittently, so that the fine particles captured by the bag filter 34 were shaken down to fall to a lower region of the flow zone region, where the high-pressure sprays conducted spraying. Here, the fine particles get granulated, while being agglomerated by being wetted with liquids, by contacting with the liquid mixture of the electric conductor carrying the catalyst and the solution or dispersion of the polymer electrolyte, and by also contacting with the liquid mixture of the electric conductor not carrying a catalyst and the dispersion containing the water repellent material. The nitrogen gas exhausted to the outside of the system was cooled by a heat exchanger separately provided outside, with vaporized ethanol or water being collected, and was again introduced through the nitrogen gas inlet, whereby the nitrogen gas was recycled.

The conditions under which the apparatus of FIG. 3 was operated as above are as follows.

Amount of electric conductor carrying catalyst: 100 g

Amount of solution or dispersion of hydrogen ion conductive polymer electrolyte: 1,000 g Spray velocity of liquid mixture of electric conductor carrying catalyst with solution or dispersion of polymer electrolyte by high-pressure spray: 10 g/min Nozzle temperature of above described high-pressure spray: 50° C.

Amount of electric conductor not carrying catalyst: 40 g

Amount of dispersion containing water repellent material: 200 g

Spray velocity of liquid mixture of electric conductor not carrying catalyst with dispersion containing water repellent material: 2 g/min Nozzle temperature of above described high-pressure spray: 80° C.

Nitrogen gas entrance temperature: 60° C.

Nitrogen gas flow rate: 0.25 m$^3$/min

The electric conductor carrying the catalyst obtained, as above, by spraying only the liquid mixture of the electric conductor carrying the catalyst with the solution or dispersion of the polymer electrolyte had, at the state of primary particles thereof, a hydrogen ion conductive polymer electrolyte and a water repellent material uniformly adhered to the surfaces thereof, and was of multinary granules having been granulated to have an average particle size of 100 μm.

The particle size, as is, was too large, so that a conductor having an average particle size of 8 μm was obtained by additionally using a grinding-granulating machine as a post-process. Further, the granulated material, obtained by spraying only the liquid mixture of the electric conductor not carrying a catalyst with the dispersion containing the water repellent material, was similarly ground so that an electric conductor having a water repellent material adhered thereto and having an average particle size of 8 μm was obtained.

Next, the electric conductor carrying the catalyst was deposited, by electrostatic coating process, on each of the front and rear surfaces of a proton conductive polymer electrolyte membrane having an outer dimension of 20 cm×32 cm, thereby to form a catalyst layer. The catalyst layer thus formed on the surface of the electrolyte membrane had an average thickness of 10 μm, and contained platinum in an amount of 0.2 mg/cm$^2$. According to the electrostatic coating, basically 1 or 2 particle layers of electrically conductive particles can be deposited on the surface of a polymer electrolyte membrane. Therefore, in the case of depositing fine electrically conductive particles, the particle size of the deposited particles gets substantially equivalent to the coating thickness of the deposition layer. According to studies here, the thickness of the catalyst layer to be able to realize a highest performance was 3 to 15 μm, and thus the electrically conductive particles to be deposited by electrostatic coating are preferred to be preliminarily granulated to be 3 to 15 μm in average diameter.

Meanwhile, an ink was prepared by adding water to the above electric conductor having the water repellent material adhered thereto. As in Example 1, this ink was coated on one surface of each of carbon non-woven fabrics having been subjected to a water repellency treatment, thereby to form a water repellent layer having a thickness of about 50 μm. Gas diffusion layers thus made were bonded to the polymer electrolyte membrane with the catalyst layers as described above, whereby a fuel cell similar to the one as in Example 1 was assembled.

Under the same conditions as in Example 1, the polymer electrolyte fuel cell as thus made according to the present Example showed an open circuit cell voltage of 99 V in the case of no load, outputting no current to outside. When this cell was subjected to a continuous powder generation at a current density of 0.7 A/cm$^2$, it was confirmed that the cell maintained the cell output of about 14.8 kW (66 V-224 A) for 8,000 hours or more.

Example 5

First of all, a method of making an electrode having a catalyst layer will be described.

A carbon powder the same as that in Example 1 was allowed to carry platinum particles having an average particle size of about 25 Å in a weight ratio of 2:1. This was referred to as an electric conductor carrying a catalyst for electrode reaction. The electric conductor carrying the catalyst was mixed, by mechanofusion process, with a hydrogen ion conductive polymer electrolyte powder. Similarly, an electric conductor not carrying a catalyst was mixed with a powder of a water repellent material by mechanofusion process. An apparatus for the mechanofusion used here has a spherical outer container having arranged therein an elliptical sample container with a rotor provided at a central portion thereof. The outer container and the rotor respectively rotate in directions opposite to each other, so that a sample charged in the sample container is given a high shear force between the inner wall surface of the container and the rotor, thereby to perform mechanofusion.

The operational conditions of the mechanofusion apparatus are as follows.
Amount of electric conductor carrying catalyst: 100 g
Amount of hydrogen ion conductive polymer electrolyte powder: 50 g
Rotational speed of outer container: 200 rpm
Rotational speed of rotor: 5,000 rpm
Amount of electric conductor not carrying a catalyst: 10 g
Amount of water repellent material powder: 5 g
Rotational speed of outer container: 200 rpm
Rotational speed of rotor: 5,000 rpm The electrically conductive particles carrying the catalyst thus obtained had, at the state of primary particles thereof, a hydrogen ion conductive polymer electrolyte uniformly adhered on the surfaces thereof. Further, the electrically conductive particles not carrying a catalyst had, at the state of primary particles thereof, a water repellent material uniformly adhered on the surfaces thereof.

It is to be noted here that other processes of mechanofusion, not having been shown in the present Example, e.g., a process by planetary bowl mill or an impacting process in high-speed flow, can similarly be used for uniformly adhering a hydrogen ion conductive polymer electrolyte or a water repellent material to surfaces of electrically conductive particles.

Next, a grinding-granulating machine was additionally used as a post-process, thereby to obtain an electric conductor carrying the catalyst and being granulated to have an average particle size of 8 μm, and an electric conductor not carrying a catalyst and being granulated to have an average particle size of 5 μm.

Thereafter, the electric conductor carrying the catalyst was deposited, by electrostatic coating process, on both the front and rear surfaces of a hydrogen ion conductive polymer electrolyte membrane having an outer dimension of 20 cm×32 cm, thereby to form a catalyst layer. The obtained catalyst layer had an average thickness of 10 μm and an amount of contained platinum of 0.2 mg/cm$^2$. The catalyst layer was fixed to the electrolyte membrane by passing, through a hot roller set at 150° C., the polymer electrolyte membrane having catalyst layers on both surfaces thereof.

Next, on both the surfaces of the polymer electrolyte membrane each having the catalyst layer formed thereon, the electric conductor not carrying a catalyst was deposited by electrostatic coating process, thereby to form a water repellent layer. The water repellent layer here had an average thickness of 5 μm. By passing, through a hot roller set at 150° C., the electrolyte membrane having the water repellent layers formed on the catalyst layers thereon, the water repellent layers were fixed thereto. Here, according to the coating process by electrostatic coating, basically 1 or 2 particle layers of electrically conductive particles can be deposited on the surface of a polymer electrolyte membrane. Therefore, in the case of depositing fine electrically conductive particles, the particle size of the deposited particles gets substantially equivalent to the coating thickness of the deposition layer. According to studies here, the thickness of the catalyst layer to be able to realize a highest performance is 5 to 20 μm, and thus the electrically conductive particles to be deposited by electrostatic coating are preferred to be preliminarily granulated to be 5 to 20 μm in average diameter.

Meanwhile, carbon papers to be gas diffusion layers were subjected to water repellency treatment. Carbon non-woven fabrics (product of Toray Industries, Inc.: TGP-H-120) each having an outer dimension of 16 cm×20 cm and a thickness of 360 µm were immersed in an aqueous dispersion (product of Daikin Industries, Ltd.: Neoflon ND1) of a fluorocarbon resin powder, were dried, and were then heated at 400° C. for 30 minutes, thereby to have water repellency.

Subsequently, the polymer electrolyte membrane having the catalyst layers and the water repellent layers formed on both surfaces thereof was subjected to bonding by a hot press so as to contact with a pair of above described gas diffusion layers, thereby to obtain an MEA. Herein, a thin film made of perfluorocarbon sulfonic acid to have a thickness of 30 µm was used for the polymer electrolyte membrane. A gasket plate made of rubber was joined to each peripheral portion of the polymer electrolyte membrane of this MEA, and manifold holes for communicating cooling water, a fuel gas and an oxidant gas were made therein.

By using above described MEA, a fuel cell was assembled in a manner similar to that in Example 1. The thus made fuel cell was supplied, at 80° C., at one electrode side thereof with a hydrogen gas humidified and heated to have a dew point of 75° C., and the other electrode side thereof with an air humidified and heated to have a dew point of 25° C. As a result, it showed an open circuit cell voltage of 99 V in the case of no load, outputting no current to outside. This cell was subjected to a continuous powder generation test under the conditions of fuel utilization rate of 85%, oxygen utilization rate of 60% and a current density of 0.7 A/cm$^2$, and was measured with respect to the variation, with time, of the output characteristics thereof. Consequently, it was confirmed that the cell according to the present Example maintained the cell output of about 14.8 kW (66 V-224 A) for 8,000 hours or more.

Example 6

In the present Example, by using an apparatus as shown in FIG. 2, an electric conductor was supplied with a spray of a dispersion containing a water repellent material, and was dried at the same time, thereby to make multinary granules made of the electric conductor carrying the water repellent material.

The conditions under which the apparatus of FIG. 2 was operated are as follows.
  Amount of acetylene black powder charged in lower cylindrical container: 150 g
  Aqueous dispersion having dispersed therein 10 wt % of water repellent material of fine PTFE particles: 500 g
  Spray velocity of dispersion of water repellent material by high-pressure spray 21: 5 g/min
  Nozzle temperature of high-pressure spray 21: 80° C.
  Nitrogen gas entrance temperature: 80° C.
  Nitrogen gas flow rate: 0.25 m$^3$/min
  Rotational speed of stirring blade 18: 350 rpm
  On/off interval of pulse-jet jetted from nozzle 20: 0.3 time/4 seconds The electric conductor not carrying a catalyst thus obtained had, at the state of primary particles thereof, a water repellent material uniformly arranged on the surfaces thereof, and was of multinary granules having been granulated and having an average particle size of 5 µm.

Next, on a front and a rear surfaces of a hydrogen ion conductive polymer electrolyte membrane (product of DuPont Company: Nafion 112) having an outer dimension of 20 cm×32 cm, an anode catalyst layer and a cathode catalyst layer were deposited by electrostatic coating process similar to the one as in Example 3. Each of these catalyst layers contained a catalyst metal in an amount of 0.2 mg/cm$^2$, and had an average thickness of 10 µm. By passing, through a hot roller set at 150° C., the polymer electrolyte membrane having the electrode catalyst layers on both surfaces thereof, the catalyst layers were fixed thereto.

Next, the above obtained multinary granules of acetylene black carrying the water repellent material were deposited, by electrostatic coating process, on both surfaces of the polymer electrolyte membrane having the above described catalyst layers, thereby to obtain water repellent layers each having an average thickness of 5 µm. By passing, through a hot roller set at 150° C., the polymer electrolyte membrane having the water repellent layers formed on the catalyst layers thereof, the water repellent layers were fixed thereto.

Meanwhile, carbon papers for gas diffusion layers of electrodes were subjected to water repellency treatment. Carbon non-woven fabrics (product of Toray Industries, Inc.: TGP-H-120) each having an outer dimension of 16 cm×20 cm and a thickness of 360 µm was immersed in an aqueous dispersion (product of Daikin Industries, Ltd.: Neoflon ND1) of a fluorocarbon resin, were dried, and were then heated at 400° C. for 30 minutes, thereby to have water repellency.

Thereafter, the above polymer electrolyte membrane was sandwiched by a pair of those carbon papers in such a way that the carbon papers contact with the water repellent layers thereof, and they were bonded by a hot press, thereby to make an MEA. By using such MEA, a cell stack of 100 stacked cells similar to the one as in Example 1 was made, wherein it showed an open circuit cell voltage of 99 V in the case of no load, outputting no current to outside, by being operated under the similar conditions. When this cell was subjected to a continuous powder generation test under a current density of 0.7 A/cm$^2$, it was confirmed that it maintained the cell output of about 14.8 kW (66 V-224 A) for 8,000 hours or more.

Example 7

Figure 4:
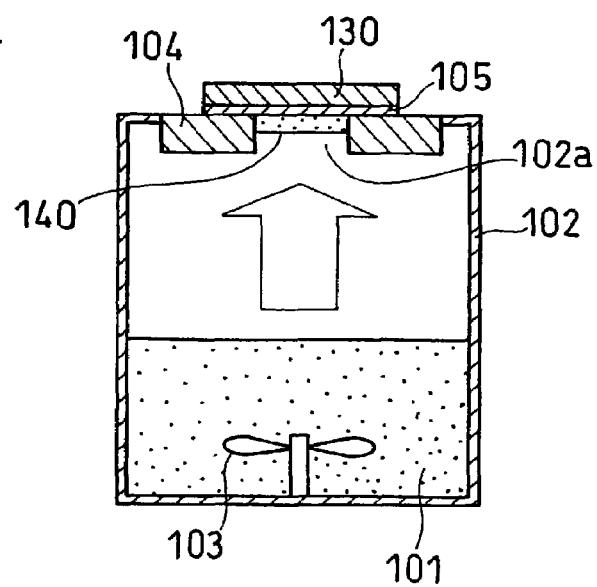
FIG. 4 is a schematic vertical cross-sectional view showing a structure of an apparatus of manufacturing an electrode for a fuel cell according to Example 6 of the present invention.

FIG. 4 is a cross-sectional view showing an apparatus for manufacturing an electrode for a fuel cell according to the present Example. Referring to FIG. 4, an electrode catalyst powder 101 is stored in a dispersion chamber 102. The inside of the dispersion chamber is filled with an inert gas. Further, at an inside of the dispersion chamber 102, a stirring blade 103 is placed, and is structured to stir the stored electrode catalyst powder 101. At an upside of the dispersion chamber 102, an opening 102a is formed. This opening 102a is structured to be able to have a masking frame 104 fixed thereto.

In the following, a method of manufacturing an electrode for a polymer electrolyte fuel cell, using that manufacturing apparatus, will be described.

First of all, the masking frame 104 is fixed to the opening 102a at the upside of the dispersion chamber 102. On the masking frame 104, a polymer electrolyte membrane 105 is placed. The polymer electrolyte membrane 105 is charged with a positive polarity by an electrode 130 coated with an insulating material. Next, the electrode catalyst powder 101 is charged into the dispersion chamber 102, and the inside of the dispersion chamber 102 is filled with an inert gas. After the inside of the dispersion chamber 102 is filled with the inert gas, the electrode catalyst powder 101 is stirred by the stirring blade 103, thereby to disperse secondary agglomerates, and to allow the electrode catalyst powder 101 to be charged, by self-frictional electrification, with a negative polarity.

The electrode catalyst powder 101 charged with a negative polarity due to self-frictional electrification by being stirred by the stirring blade 103 is adsorbed onto the polymer electrolyte membrane 105, having a positive polarity, placed at the upper portion.

The polymer electrolyte membrane 105 is partially masked in a given shape by the masking frame 104, which is cut, for example, to a 60 mm square. Accordingly, the electrode catalyst powder 101 is adhered to the portion of the polymer electrolyte membrane 105, which is not masked by the masking frame 104, thereby to form an electrode catalyst layer 140. The polymer electrolyte membrane 105 having the thus formed electrode catalyst layer 140 is detached from the masking frame 104, and the electrode catalyst layer 140 is heat-fused to the polymer electrolyte membrane 105 by a hot roller. This manufacturing apparatus is so structured to continuously perform the process as above, in which the polymer electrolyte membrane 105 having the electrode catalyst layer 140 is detached from the masking frame 104, is conveyed to the hot roller, and is then heated and compressed. Although a hot roller was used in the present Example, the heating and the compression can also be conducted by a hot press instead of a hot roller.

The electrode catalyst powder 101 used in the present Example was made as follows. Particles made of a carbon powder being allowed to carry platinum in a weight ratio of 75:25 as well as a solution or dispersion of a polymer electrolyte (Nafion solution) were used. Thereby, in a similar manner as in Example 1, primary particles carrying the catalyst and the polymer electrolyte were granulated to prepare multinary granules, having a particle size of 3 to 15 μm, as particles for forming catalyst layers. Further, for the polymer electrolyte membrane 105, a product of Japan Gore-Tex Inc. was used.

The catalyst layer as above formed had a thickness of about 30 μm. After a catalyst layer was formed on one surface of the polymer electrolyte membrane 105 in such manner, a further catalyst layer 140 was similarly formed by electrodeposition on the other surface thereof, and was heat-fused.

The catalyst layers, at both sides, were sandwiched by carbon papers (product of Toray Industries, Inc.: 360 μm thickness) having been cut to have a size the same as that of each of the above catalyst layers, thereby to structure a unit cell. The carbon paper used here is such one as having been subjected to water repellency treatment by being preliminarily immersed in an aqueous dispersion (product of Daikin Industries, Ltd.: Neoflon ND1) of a fluorocarbon resin powder, and then fired. The thus manufactured unit cell was set at an apparatus for measuring unit cells, whereby the cell performance was measured.

For comparison, an electrode for a fuel cell was made by using spray coating process, which is currently used in general. In the case of using spray coating process, it is difficult to perform direct spray coating onto a polymer electrolyte membrane, so that spray coating thereof was performed onto a gas diffusion layer as widely practiced conventionally. Firstly, to an electrode catalyst powder, butanol of an amount three times as much was added, and further a few drops of a commercially available surfactant (product of Nihon Surfactant Kogyo K.K.: NP-10) were added thereto, all of which were mixed by a ball milling process, thereby to make an ink for spray coating. This ink was printed on a carbon paper by spray coating. The carbon paper having the ink thus coated thereon can be sufficiently dried at 80° C., thereby to form an electrode. By using two of such electrodes, with a solvent having been removed by drying, a polymer electrolyte membrane was sandwiched to make a unit cell as Comparative Example 1.

With thus made unit cell being set at 80° C., a hydrogen gas humidified and heated to have a dew point of 75° C. and air humidified and heated to have a dew point of 65° C. were respectively supplied to the anode and the cathode thereof, and the cell was operated under the conditions of fuel utilization rate of 90% and oxygen utilization rate of 30%.

Figure 5:
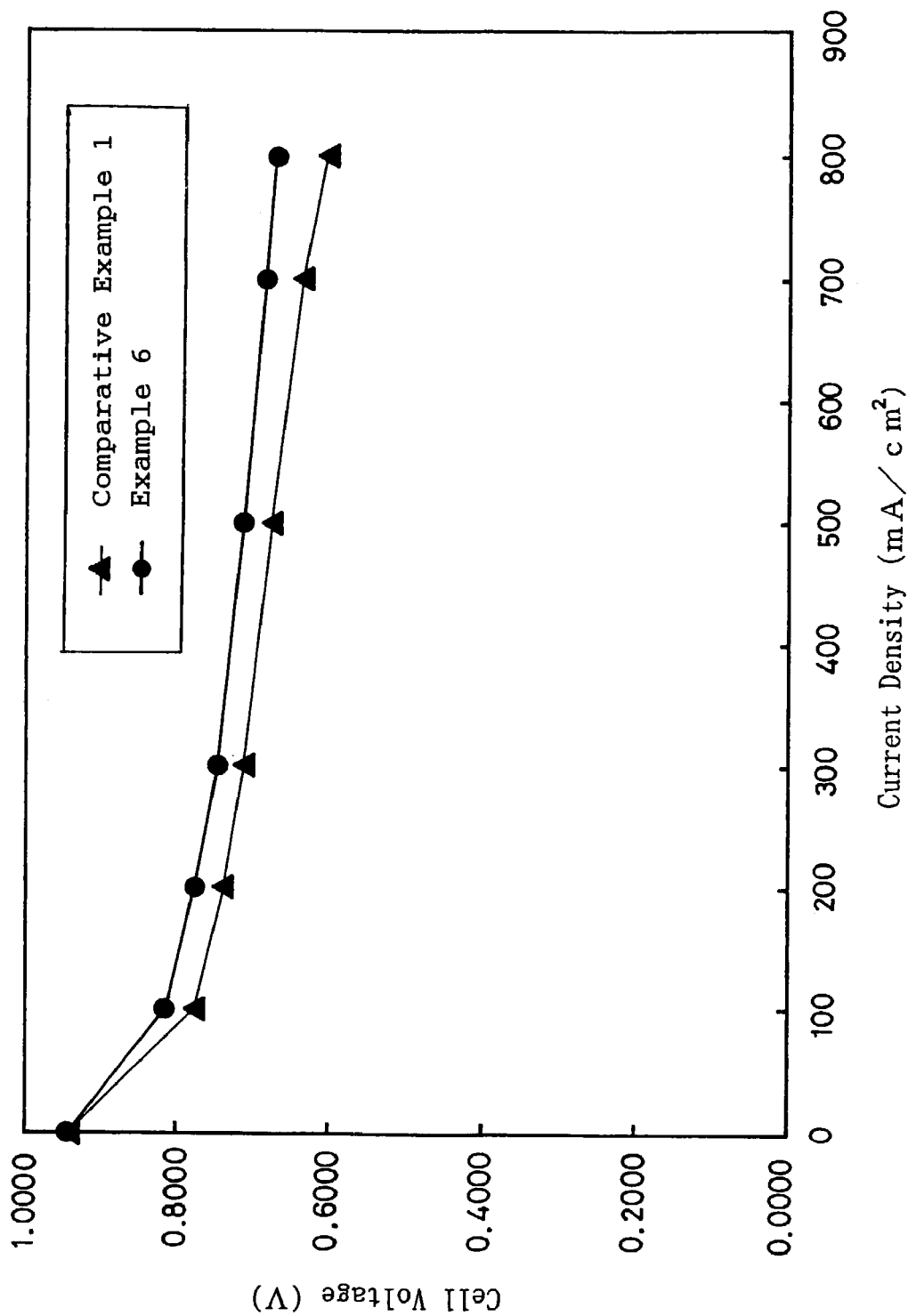
FIG. 5 is a graph showing current-voltage characteristics of a fuel cell having an electrode for a fuel cell according to Example 7 of the present invention and of a fuel cell having an electrode for a fuel cell according to Comparative Example 1.

FIG. 5 shows current-voltage characteristics of both the fuel cell having an electrode according to the present Example and the fuel cell having an electrode according to Comparative Example 1. As shown in FIG. 5, it can be understood that the fuel cell according to the present Example has superior current-voltage characteristics as compared with the cell using the electrode according to the Comparative Example, which was manufactured by spray coating.

The electrode formed by electrostatically charging the electrode catalyst powder 101 and depositing it on the polymer electrolyte membrane 105 in the manufacturing apparatus according to the present Example is superior to the one according to the conventional manufacturing method in terms of structure as well as performance. Further, the method of making the electrode according to the present Example is effective, in contrast to the conventional manufacturing method, from the viewpoint of preventing environmental pollutions, because hazardous materials such as organic solvents are not contained therein. Moreover, in the manufacturing apparatus of the present Example, electrode catalyst powder having been deposited on locations other than necessary ones are securely collected, thereby to avoid wastes thereof, so that it is superior from the viewpoint of lowering cost and promoting resource saving as well.

Example 8

The present Example shows an example of forming a catalyst layer on a carbon paper as a diffusion layer.

In the apparatus of FIG. 4, a carbon paper is placed instead of the electrolyte membrane 105, and the portion thereof not masked by the masking frame 104 has the electrode catalyst powder 101 electrodeposited thereon. The surface of this carbon paper, on which to form a catalyst layer, has a water repellent layer formed thereon for having water repellency. This water repellent layer is formed by coating thereon a mixture of a water repellent material and a carbon powder.

Two of carbon papers each having the thus formed water repellent layer were prepared, and used to sandwich therebetween a polymer electrolyte membrane at its both sides, thereby to obtain a unit cell. This unit cell was placed at an apparatus for measuring unit cells, and the cell performance thereof was measured. As a result, the cell was confirmed to have similarly superior characteristics as in the unit cell of Example 7.

Example 9

Figure 6:
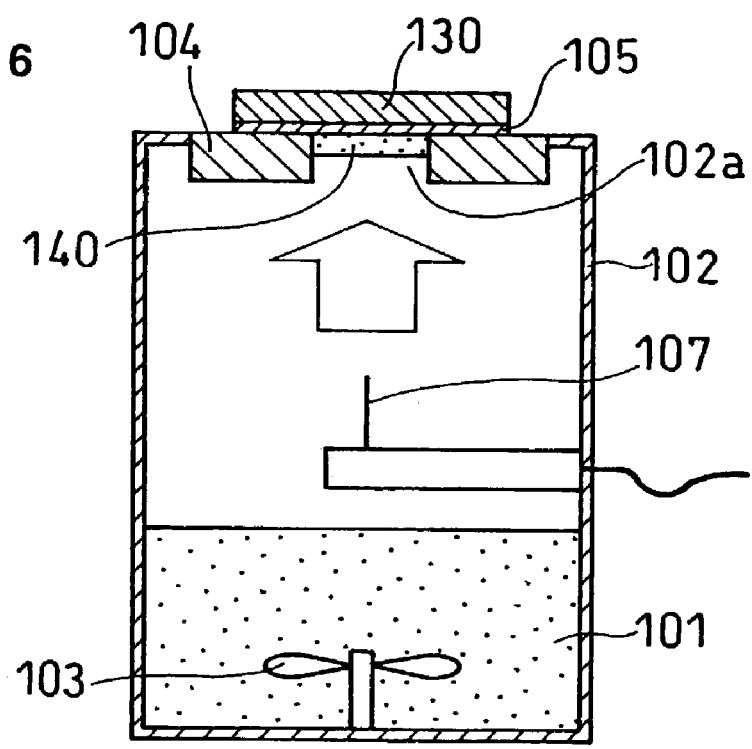
FIG. 6 is a schematic cross-sectional view showing a structure of an apparatus of manufacturing an electrode for a fuel cell according to Example 8 of the present invention.

FIG. 6 shows an apparatus for manufacturing an electrode for a fuel cell according to the present Example. Referring to FIG. 6, elements having same functions and structures as those in Example 7 are designated by the correspondingly same reference numerals, and their descriptions are omitted here.

In the apparatus according to the present Example, a corona discharging rod 107 is provided at a substantially central portion of the space inside a dispersion chamber 102.

Because of the provision of this corona discharging rod 107, not only an electrode catalyst powder 101 is subjected to self-frictional electrification by a stirring blade, but also corona discharge is generated in the space inside the dispersion chamber by the corona discharging rod 107, thereby to allow the space inside the dispersion chamber to have a negative ion atmosphere.

The electrode catalyst powder 101 thus securely charged with a negative polarity is adsorbed onto a polymer electrolyte membrane 105 of a positive polarity, thereby to form an electrode catalyst layer 140.

For example, a platinum wire having a diameter of 0.3 mm and a length of 50 mm is used for the corona discharging rod, and a voltage of 5 kV is applied thereto.

By using the manufacturing apparatus according to the present Example, the electrode catalyst powder 101 can be coated on the polymer electrolyte membrane 105 in a shorter time and a higher density, thus making it possible to manufacture a higher performance electrode, as compared with the case of using the manufacturing apparatus of Example 7 or Example 8.

Example 10

Figure 7:
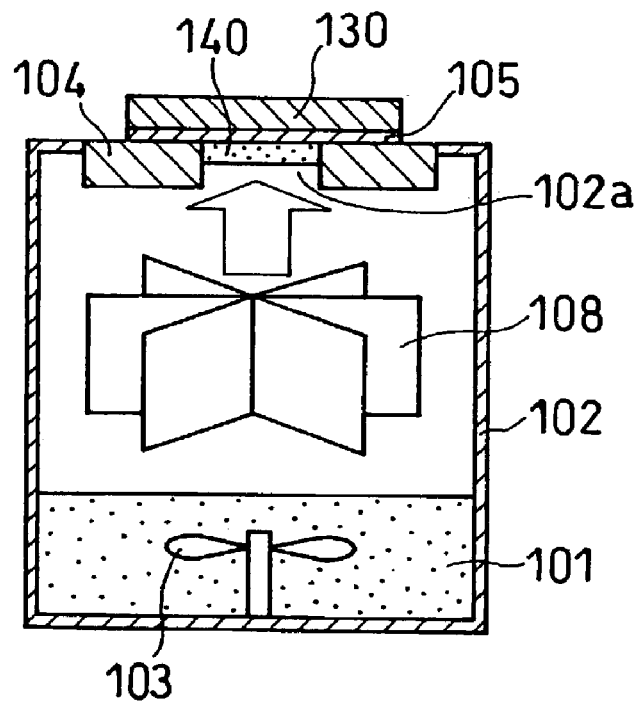
FIG. 7 is a schematic cross-sectional view showing a structure of an apparatus of manufacturing an electrode for a fuel cell according to Example 9 of the present invention.

FIG. 7 shows an apparatus for manufacturing an electrode for a fuel cell according to the present Example.

Referring to FIG. 7, elements having same functions and structures as those in Example 7 are designated by the correspondingly same reference numerals, and their descriptions are omitted here.

According to the apparatus of the present Example, current straightening plates 108 are provided as a powder flow guide inside a dispersion chamber 102. The current straightening plates 108 are placed between a stored electrode catalyst powder 101 and an opening 102*a*, and are structured to allow the electrode catalyst powder 101 having been stirred by a stirring blade 103 to flow rectilinearly upward. The current straightening plates 108 are constituted by plural plates arranged radially from a vertically directed axis, as a center, positioned at a central portion of the space inside the dispersion chamber. The current straightening plates 108 are formed by intercrossing four plates each having a size of 150 mm×100 cm and being made of polyvinylchloride. However, the present invention is not limited to such structure thereof, and any means can be used therefor, if it straightens the flow of the electrode catalyst powder to flow rectilinearly upward.

By using the apparatus according to the present Example as described above, a swirling flow of the electrode catalyst powder 101 generated by the rotation of the stirring blade 103 can be straightened by the current straightening plates 108, so as to allow the electrode catalyst powder 101 to flow rectilinearly toward an electrolyte membrane. Therefore, by performing a similar coating process as in Example 7 with the use of the manufacturing apparatus having the current straightening plates 108, the electrode catalyst powder is more uniformly deposited onto the polymer electrolyte membrane, as compared with the electrode manufactured by using the manufacturing apparatus of Example 7, which does not have current straightening plates or some other type of powder flow guide. As a result, a polymer electrolyte membrane-electrode assembly having a higher performance can be obtained.

Example 11

Figure 8:
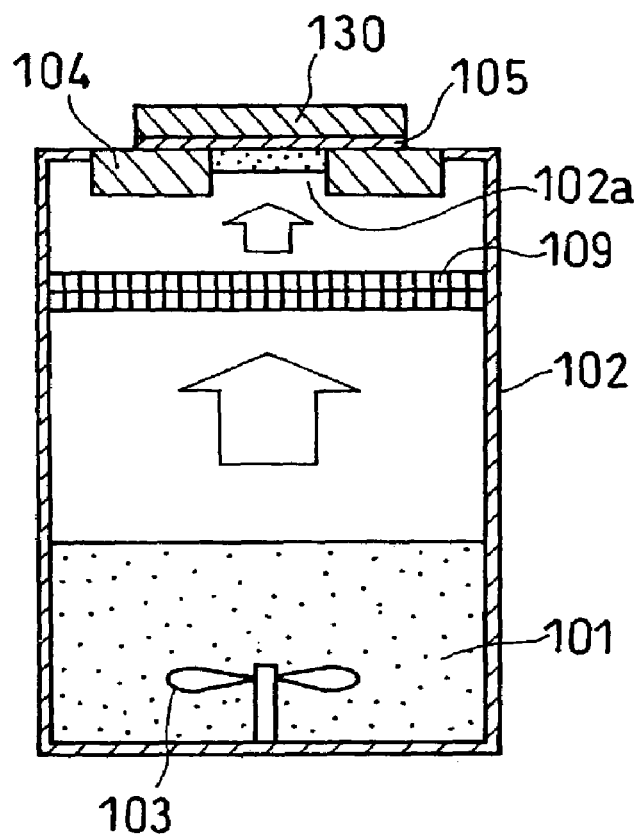
FIG. 8 is a schematic cross-sectional view showing a structure of an apparatus of manufacturing an electrode for a fuel cell according to Example 10 of the present invention.

FIG. 8 shows an apparatus for manufacturing an electrode for a fuel cell according to the present Example.

Referring to FIG. 8, elements having same functions and structures as those in Example 7 are designated by the correspondingly same reference numerals, and their descriptions are omitted here.

According to the apparatus of the present Example, a mesh plate 109 is provided as a powder flow guide in a dispersion chamber 102. The mesh plate is placed between a stored electrode catalyst powder 101 and an opening 102*a*, and is so structured that the electrode catalyst powder 101 having been stirred by a stirring blade 103 passes therethrough and flows rectilinearly upward. A mesh of standard wire gauge No. 19-6 was used for the mesh plate 109 having plural through-holes. It is to be noted here that the mesh plate can also be a plate having at least plural through-holes instead of above described mesh.

By using this manufacturing apparatus, the electrode catalyst powder is passed through the mesh plate 109, thereby to mitigate rotational movement of a swirling flow thereof generated by the rotation of the stirring blade 103, so that the electrode catalyst powder 101 flows rectilinearly. Therefore, by performing a similar coating process as in Example 7 with the use of the manufacturing apparatus having the mesh plate 109, the electrode catalyst powder 101 is more uniformly and densely deposited onto a polymer electrolyte membrane, as compared with the electrode manufactured by using a manufacturing apparatus, which does not have a mesh plate 109 or other powder flow guide. Consequently, a polymer electrolyte membrane-catalyst layer assembly having a higher performance can be obtained by the manufacturing apparatus according to the present Example.

Example 12

Figure 9:
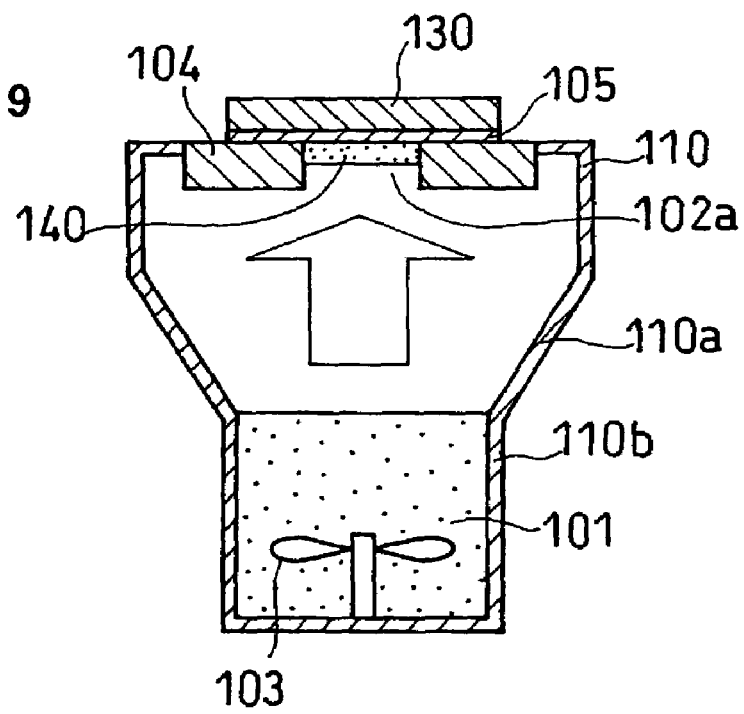
FIG. 9 is a schematic cross-sectional view showing a structure of an apparatus of manufacturing an electrode for a fuel cell according to Example 11 of the present invention.

FIG. 9 shows an apparatus for manufacturing an electrode for a fuel cell according to the present Example.

Referring to FIG. 9, elements having same functions and structures as those in Example 7 are designated by the correspondingly same reference numerals, and their descriptions are omitted here.

The manufacturing apparatus according to the present Example is characterized by the shape of a dispersion chamber 110, with such shape as having different radiuses at an upper and a lower portion thereof, in contrast to substantially cylindrical dispersion chambers 102 each having one same radius.

The dispersion chamber 110 has a storing chamber 110*b* to store an electrode catalyst powder 101, and a diffusion chamber 110*a* to be a flow path through which the electrode catalyst powder having been stirred by a stirring blade 103 flows upward. The storing chamber 110*b* spanning from the bottom to substantially the middle of the dispersion chamber 110 has a shape of cylinder having a diameter smaller than that of the upper diffusion chamber 110*a*. Further, the diffusion chamber 110*a* is formed to have a hopper-shaped cone spanning from substantially the middle toward an upper portion of the dispersion chamber 110, and thus has a structure that stagnation is unlikely to occur inside the diffusion chamber. As a result, by the manufacturing apparatus according to the present Example, the electrode catalyst powder 101 having been stirred is effectively diffused, and the coating time is very much shortened.

The hopper-shape of the dispersion chamber 110 is a shape applicable to each of above described Examples. By using this shape, the manufacturing time according to each Example can further be very much shortened.

Example 13

Figure 10:
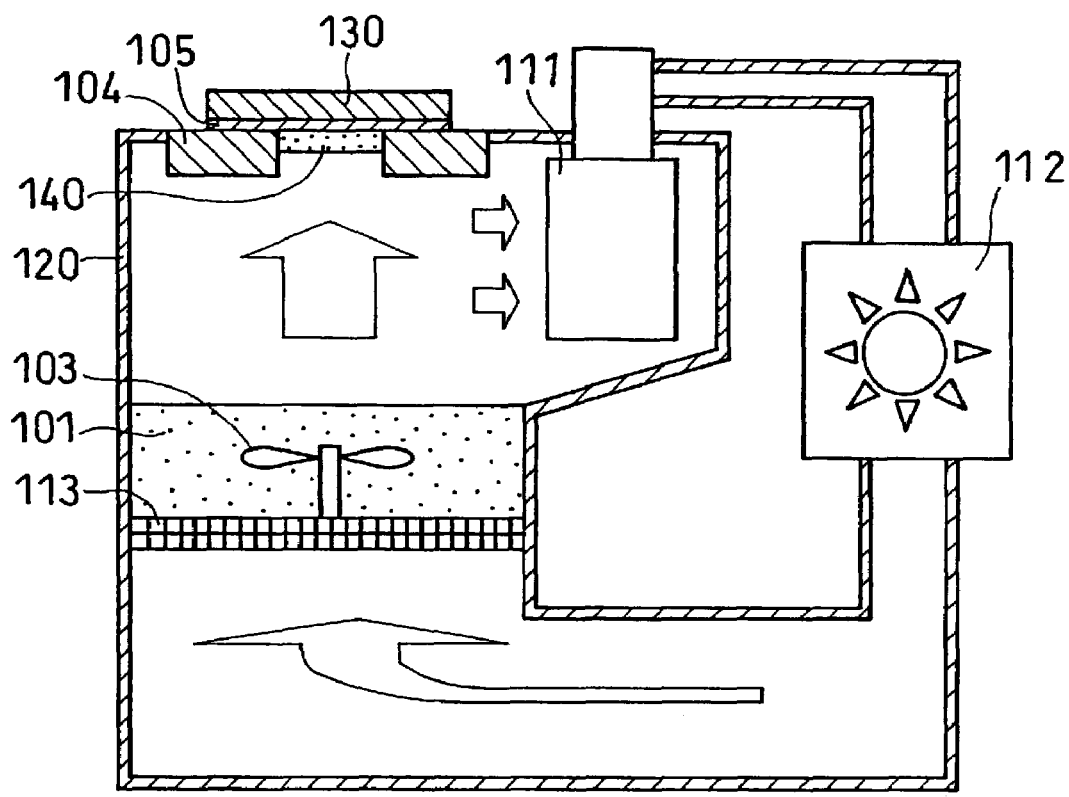
FIG. 10 is a schematic cross-sectional view showing a structure of an apparatus of manufacturing an electrode for a fuel cell according to Example 12 of the present invention.

FIG. 10 shows an apparatus for manufacturing an electrode for a fuel cell according to the present Example.

Referring to FIG. 10, elements having same functions and structures as those in Example 7 are designated by the correspondingly same reference numerals, and their descriptions are omitted here.

The manufacturing apparatus according to the present Example has a blower 112 provided therein, and is structured in such a way that a carrier gas, being an inert gas, in a dispersion chamber is forced to circulate. At an outlet of a dispersion chamber 120 to the blower 112, a filter 111 is provided to remove, thereby, an electrode catalyst powder contained in the carrier gas. The carrier gas from the blower 112 is fed into the dispersion chamber 120 through a metal mesh plate 113 provided at a bottom of the dispersion chamber 120. This metal mesh plate 113 is so structured as to pass the carrier gas and to prevent the electrode catalyst powder 101 from passing therethrough. Further, a negative voltage is applied to the metal mesh plate 113 by a voltage generator (not shown). Therefore, the carrier gas, having passed the metal mesh plate 113, are negatively charged, and are then fed into the dispersion chamber 120. Consequently, the electrode catalyst powder 101 having been stirred by the stirring blade 103 to become dispersed from an agglomerate state is strongly charged with a negative polarity, to thereby promote the dispersion thereof, and to be diffused into the space inside the dispersion chamber. The electrode catalyst powder 101 having been charged with a negative polarity is electrodeposited onto a polymer electrolyte membrane 105 placed at a masking frame 104, to thereby form a catalyst layer 140.

As described above, the carrier gas causes the electrode catalyst powder 101 to be electrodeposited onto the polymer electrolyte membrane 105, and thereafter, unnecessary electrode catalyst powder 101 is removed at the filter 111, and then the carrier gas is again fed to the blower 112 and is forced to circulate.

A fuel cell using a catalyst layer made by electro-statically depositing the electrode catalyst powder 101 onto the polymer electrolyte membrane, with the use of the same electrode catalyst powder as in Example 7 and with the use of the manufacturing apparatus shown in FIG. 10, showed similarly superior characteristics as in Example 7.

It is to be noted here that the present Example employs a structure to negatively charge the carrier gas by the metal mesh plate 113, but the present invention is not limited to such structure. Any other structures can be employed, if the carrier gas can be negatively charged thereby.

Example 14

Figure 11:
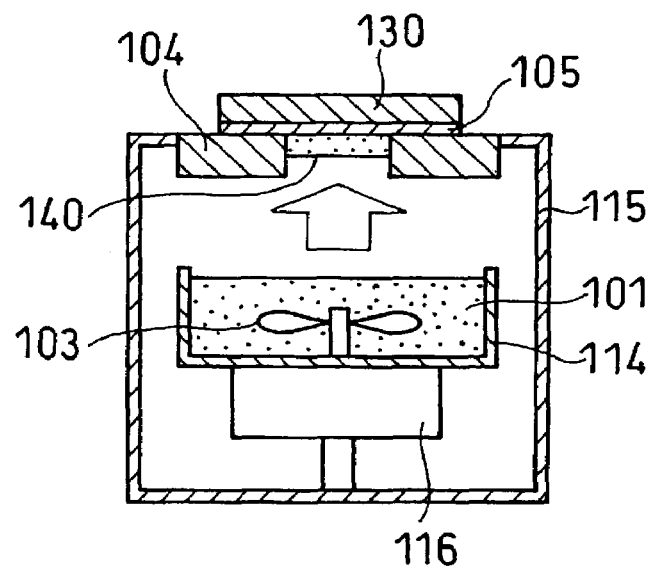
FIG. 11 is a schematic cross-sectional view showing a structure of an apparatus of manufacturing an electrode for a fuel cell according to Example 13 of the present invention.

FIG. 11 shows an apparatus for manufacturing an electrode for a fuel cell according to the present Example.

Referring to FIG. 11, elements having same functions and structures as those in Example 7 are designated by the correspondingly same reference numerals, and their descriptions are omitted here.

In the manufacturing apparatus according to the present Example, an electrode catalyst powder 101 is stored in an electrode catalyst powder vessel 114 made of metal. This electrode catalyst powder vessel 114 is charged with a negative polarity. The electrode catalyst powder vessel 114 has a vibrator 116 provided thereunder, and structured to vibrate the charged electrode catalyst powder 101.

On a masking frame 104 at the upside of a dispersion chamber 115, a polymer electrolyte membrane 105 together with a positive electrode 130 is placed. Under the condition that the polymer electrolyte membrane 105 is thus placed on the masking frame 104, the inside of the dispersion chamber is filled with an inert gas, while the negatively charged electrode catalyst powder 101 is stirred by a stirring blade 103, and is vibrated to disperse secondary agglomerates of the electrode catalyst powder 101.

As described above, a voltage is applied between a pair of electrodes (the electrode catalyst powder vessel 114 of negative polarity and the electrode 130 of positive polarity) to charge the electrode catalyst powder 101 into the electrode catalyst powder vessel 114, and the powder is vibrated by the vibrator 116, whereby the diffused electrode catalyst powder 101 is uniformly deposited on the polymer electrolyte membrane 105, which is charged with charges opposite to those of the electrode catalyst powder 101.

Next, electrodes were manufactured by using the following three kinds of electrode catalyst powders with the use of the apparatus for manufacturing an electrode for a fuel cell according to the present Example:

(1) Electrode catalyst powder A: Carbon powder (particle size: 3 to 15 μm) carrying platinum;

(2) Electrode catalyst powder B: Carbon particles carrying platinum and the polymer electrolyte as used in Example 7; and (3) Electrode catalyst powder C: Multinary granules, as manufactured in Example 3, having been granulated to have an average particle size of 10 μm, and comprising carbon particles carrying the catalyst, in which at the state of primary particles, the hydrogen ion conductive polymer electrolyte and the water repellent material are uniformly arranged on the surfaces thereof.

The polymer electrolyte membrane used here is the same as the polymer electrolyte membrane as used in Example 7.

Catalyst layers were formed on both surfaces of each of the polymer electrolyte membranes by respectively using above described electrode catalyst powders A, B and C with the use of the apparatus for manufacturing an electrode for a fuel cell according to the present Example. By using materials and structures the same as those in Example 7, except for the electrode catalyst powders, unit cells were assembled, and the cell characteristics were measured under the same conditions as therein.

Table 2 shows comparison among the cell voltages, when these cells were discharged at 0.3 A/cm$^2$. Table 2 at the same time shows the cell characteristics of the cell of Comparative Example 1.

TABLE 2

|  | Cell voltage (mV) |
|---|---|
| Cell by electrode catalyst powder A | 710 |
| Cell by electrode catalyst powder B | 725 |
| Cell by electrode catalyst powder C | 730 |
| Cell having electrode of comparative Example | 675 |

As evident from Table 2, it can be understood that in the case of any one of the unit cells using electrode catalyst powders A, B and C, the cell performance becomes higher than the unit cell using the electrode of Comparative Example 1. The unit cell using electrode catalyst powder C, inter alia, was superior to the unit cells using electrode catalyst powders A and B. This is presumably because electrode catalyst powder C carries a water repellent material, so that the gas diffusion in the catalyst layers and the water repellency of the electrodes were improved thereby. It is to be noted here that the above cell voltage measurements were performed with respect to the unit cells each made by forming catalyst layers on the polymer electrolyte membrane and by joining carbon papers therewith, but that similar results of measurements were obtained, as well, in the case of unit cells each made by forming catalyst layers on carbon papers and by joining them with the electrolyte membrane.

In the Examples, carbon powders each carrying platinum and further having a polymer electrolyte coated thereon were used for the electrode catalyst powders. Instead, however, a powder mixture of a carbon powder carrying platinum or a carbon powder carrying platinum and further having a polymer electrolyte coated thereon with a carbon powder carrying PTFE can also be used. Furthermore, the carbon carrying platinum can be allowed to carry another noble metal such as ruthenium, gold and palladium instead of platinum. The fluorocarbon resin to be used for water repellency treatment is not limited to PTFE. Still further, the electrode catalyst powder is not limited to one of above described three kinds of electrode catalyst powders A, B and C. A mixture of them or a laminate of them made by sequentially forming layers thereof can also be used.

It is most preferable from the viewpoints of e.g. mixture condition, flowing property, particle size distribution and electrostatic charging performance of a carbon powder and a polymer electrolyte: that the electrode catalyst powder to be used for the present invention contain either a fine carbon powder carrying a noble metal, or a mixture of a fine carbon powder carrying a noble metal with a polymer electrolyte, or a mixture of a fine carbon powder carrying a noble metal with a polymer electrolyte and a fine carbon powder having been subjected to water repellency treatment with a fluorocarbon resin; and that such powder be grown to multinary granules by being supplied with a spray of a solution or dispersion of a polymer electrolyte, dried, granulated and ground, while being dispersed and stirred by using dry air and a stirring structure.

According to one embodiment of the present invention, a catalyst layer is thermally bonded to a polymer electrolyte membrane or a diffusion layer by using a hot roller or a hot press. Thereby, the catalyst layer is securely bonded thereto, whereby an electrode having high durability can be obtained.

As described above, in the apparatus of each of the Examples according to the present invention, an electrode catalyst powder is charged by a charged carrier gas, and this electrode catalyst powder is electrostatically coated on a polymer electrolyte membrane or on a carbon paper, to thereby form an electrode. Accordingly, the manufacturing apparatuses according to these embodiments of the present invention have superior effects to manufacture superior electrodes in a shorter time as compared with conventional apparatuses for manufacturing electrodes.

By using the method of manufacturing an electrode in each of the Examples according to the present invention, it is also possible to electrostatically deposit an electrode catalyst powder on the surface of a sheet-form article other than on a polymer electrolyte membrane, and thereafter to transfer the electrode catalyst powder onto a polymer electrolyte membrane or a gas diffusion layer.

Further, in the case that the area of an electrode to be made is large, it is possible to make a uniform electrode having a large size by moving, at a constant speed, a polymer electrolyte membrane in a manufacturing apparatus according to an embodiment of the present invention, and by continuously coating an electrode catalyst powder thereon. Furthermore, polymer electrolyte membranes and gas diffusion layers to be used for the present invention are not limited to those used in the Examples, but other materials, if having the same functions as those, can also be used, and shapes of those are not limited to such ones as in the Examples.

INDUSTRIAL APPLICABILITY

According to embodiments of the present invention, an electrode for a fuel cell having an optimized catalyst layer can be provided. Further, according to one aspect of the present invention, the step of preparing a granulated electrically conductive powder by adhering a polymer electrolyte to an electrically conductive powder for forming a catalyst layer containing a fine electrically conductive powder is separated from the step of forming the catalyst layer by depositing the granulated electrically conductive powder. This makes it possible to use an organic solvent at only the former step, which can be implemented by a comparatively small size facility. Thus, the electrode manufacturing step, which needs a large size facility, can be of a complete organic solvent-free or a dry process, and does not have a danger due to organic solvents.

Since the method of making an electrode, by electrostatic coating, according to one aspect of the present invention is a completely dry process, materials can be easily stored and stably supplied for a long time from the viewpoint of maintaining the quality of and storing the materials at a manufacturing site, so that it is possible to significantly simplify the facility for the manufacturing process.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A polymer electrolyte fuel cell comprising a hydrogen ion conductive polymer electrolyte membrane, a pair of electrodes sandwiching said polymer electrolyte membrane therebetween, an electrically conductive separator plate having a gas flow channel for supplying a fuel gas to one of said electrodes, and an electrically conductive separator plate having a gas flow channel for supplying an oxidant gas to the other of said electrodes, wherein each of said electrodes comprises a catalyst layer and a gas diffusion layer, wherein said catalyst layer comprises electrically conductive multinary granules having an average granule diameter of about 3 µm to 15 µm, said multinary granules comprising electrically conductive primary particles having an average particle diameter not exceeding about 150 nm, a catalyst and a hydrogen ion conductive polymer electrolyte, and wherein the polymer electrolyte fuel cell further comprises, between said catalyst layer and said gas diffusion layer, a layer of multinary granules having an average granule diameter of about 3 μm to 15 μm and comprising electrically conductive primary particles which do not carry a catalyst and have an average particle diameter not exceeding about 150 nm.

2. The polymer electrolyte fuel cell according to claim 1, wherein said electrically conductive multinary granules further comprise a water repellent material.

3. The polymer electrolyte fuel cell according to claim 1, wherein said electrically conductive primary particles carry a water repellent material on surfaces thereof.

* * * * *